United States Patent
Thrimawithana et al.

(10) Patent No.: US 12,368,325 B2
(45) Date of Patent: Jul. 22, 2025

(54) ACTIVE IMPEDANCE CONTROL

(71) Applicant: Auckland Uniservices Limited, Auckland (NZ)

(72) Inventors: Duleepa Jayanath Thrimawithana, Auckland (NZ); Cody Yang Liu, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 261 days.

(21) Appl. No.: 17/842,312

(22) Filed: Jun. 16, 2022

(65) Prior Publication Data

US 2022/0407362 A1 Dec. 22, 2022

Related U.S. Application Data

(63) Continuation of application No. PCT/IB2020/062424, filed on Dec. 24, 2020.

(51) Int. Cl.
*H02J 50/12* (2016.01)
*H02J 7/00* (2006.01)
*H02J 7/02* (2016.01)

(52) U.S. Cl.
CPC .......... *H02J 50/12* (2016.02); *H02J 7/00712* (2020.01); *H02J 7/02* (2013.01)

(58) Field of Classification Search
CPC ........... H02J 50/12; H02J 7/00712; H02J 7/02
See application file for complete search history.

(56) References Cited

U.S. PATENT DOCUMENTS

| | | | |
|---|---|---|---|
| 10,090,772 B2 | 10/2018 | Perreault et al. | |
| 10,833,638 B2* | 11/2020 | Govindaraj | H02J 7/0071 |
| 2015/0015197 A1 | 1/2015 | Mi et al. | |
| 2015/0035377 A1 | 2/2015 | James et al. | |
| 2015/0200548 A1 | 7/2015 | Covic et al. | |
| 2017/0222488 A1* | 8/2017 | Madawala | H02M 3/33523 |
| 2017/0346343 A1* | 11/2017 | Atasoy | H01F 38/14 |

FOREIGN PATENT DOCUMENTS

AU 2016231618 A1 10/2016

OTHER PUBLICATIONS

International Search Report and Written Opinion in counterpart International Application No. PCT/IB2020/062424, mailed Mar. 16, 2021, 26 pages.
Choi, J. et al., 'Implementing an Impedance Compression Network to Compensate for Misalignments in a Wireless Power Transfer System', IEEE Transactions on Power Electronics, vol. 34, No. 5, May 2019, pp. 4173 to 4184. See in particularly the abstract, Section 2B, Fig. 3, EQ. 3 and EQ. 10.

(Continued)

*Primary Examiner* — Carlos Amaya
(74) *Attorney, Agent, or Firm* — Edell, Shapiro & Finnan, LLC

(57) ABSTRACT

A resonant inductive power transfer circuit has a power converter to supply to a load, and the converter is concurrently controlled to create a controlled reactance that substantially compensates for variability in the coupling with the another resonant inductive power transfer circuit and/or changes in the load supplied by the power converter.

14 Claims, 21 Drawing Sheets

(56) References Cited

OTHER PUBLICATIONS

Vu, V et al., 'Implementation of the Constant Current and Constant Voltage Charge of Inductive Power Transfer Systems with the Double-Sided LCC Compensation Topology for Electric Vehicle Battery Charge Applications', IEEE Transactions on Power Electronics, vol. 33, No. 9, Sep. 2018, pp. 7398 to 7410. See in particularly the abstract, section III item C, section IV.

Shevchenko, V et al., 'Compensation Topologies in IPT Systems: Standards, Requirements, Classification, Analysis, Comparison and Application', IEEE Access, vol. 7, Aug. 27, 2019, pp. 120559 to 120580. See in particularly the abstract, sections III and IV.

* cited by examiner

ACTIVE IMPEDANCE CONTROL

FIELD

This disclosure relates to wireless power transfer (WPT), also commonly referred to as inductive power transfer (IPT). The disclosure has particular relevance to active control of the impedance of an IPT system, or components thereof such as primary and secondary circuits, in order to regulate power flow.

BACKGROUND

IPT systems are well known, having a primary side and a secondary (also known as a pick-up) side that are loosely magnetically coupled. In uni-directional systems power flows in one direction, from the primary to the secondary. In bi-directional systems power may flow in either direction. This document should be interpreted as relating to uni- or bi-directional systems, so discussion of secondary circuits, apparatus or systems for example can equally apply to primary circuits, apparatus or systems.

The IPT systems and circuits that are the subject of this disclosure have many different applications in practice. One popular application is charging of electric vehicles (EVs). As the uptake of electric vehicles (EV's) continues to grow around the world, effective charging techniques have become a major point of discussion. Traditionally, conductive charging techniques (wired charging) have been used, however these techniques suffer from reliability and safety issues at high power levels. To minimise safety concerns, minimal user input is preferred to initiate the charging process therefore there has been a shift towards wireless charging techniques. This trend is further highlighted by the introduction of standards such as SAE J2954, which provides specification guidelines on the implementation of wireless chargers for EV's. SAE J2954 specifies wireless charging through inductive power transfer (IPT), which is currently the preferred technology for wireless power applications.

In a conventional IPT system, such as that shown in FIG. 1, the primary and/or secondary circuits have a power transfer coil, a compensation network which may comprise one or more elements or components, and a power converter which may be a half or full bridge. When either the magnetic coupling between the primary and secondary coils changes, or when the EV battery voltage changes, the controller(s) in the primary and/or the pick-up has to regulate the power flow by modulating the effective voltage applied across the input to the primary and/or pick-up compensation networks. Modulating the voltage across the input of a compensation network leads to a change in current if a fixed amount of power is delivered. So, for example, if the coupling increases by 3 times (typical for an EV charger), the voltage applied needs to be reduced by 3 times through modulation of switches, which leads to a 3 times increase in switch current. This not only increases the conduction losses of the switches, but also increases switching losses (due to modulation) and the cost of the devices required. These issues are not solely applicable to EV applications.

In some applications the compensation network is designed to compensate for the non-linearity introduced by the power converter at an operating point, but there are still significant reactive impedance components caused by changes in coupling or load in operation of the circuit that are uncompensated, resulting in poor power factor and losses in the system.

In some applications, the compensation networks are detuned using active control, to regulate the power flow, without modulating the duty-cycle of the switches. This is achieved using, for example phase-control, switching in/out reactive elements or using variable reactors. Although this may help reduce the switching losses, current stress still remains an issue. Additionally, detuning the compensation network leads to a poor power factor, further increasing the losses in the system.

Some systems have attempted to address the above issue using an impedance compression network (abbreviated ZCN) and a tuneable matching network (abbreviated TMN). The sole purpose of the impedance compression network is to passively regulate the power transfer when the output voltage changes (for example due to a battery charging from 280 V to 420 V). The tuneable matching network is therefore only used to regulate the power flow when coupling changes due to misalignment between pads. The compensation networks are specifically designed so that when the impedance of the load branch is controlled using the TMN, the system still remains almost tuned at the operating frequency. Controlling the impedance of the load branch helps the system to regulate the power flow without increasing the current stress of the power electronics employed.

Unfortunately, impedance compression networks and tuneable matching networks can significantly increase the cost and size of a wireless power transfer system.

Object

It is an object of the present disclosure to provide an apparatus, system or method that overcomes one or more of the disadvantages of existing systems, or which at least provides a viable alternative.

SUMMARY

This disclosure proposes a secondary or primary wireless power transfer circuit having a compensation network and controlled power converter which are configured to control the impedance of the circuit.

The circuits proposed may use the existing power converter and existing compensation networks to thus provide systems or methods that can be used to achieve a similar performance to those that employ ZCNs and TMNs. However, the operation of these circuits is distinctly different from known approaches to impedance control of wireless power transfer circuits.

In one aspect a method is provided for controlling a wireless power transfer circuit comprising a compensation circuit and a controllable power converter connected to the compensation circuit, the method comprising:

switching the controllable power converter to provide a controlled reactance, which controlled reactance in combination with the reactance of the compensation network substantially compensates for variations in reactance seen at an input to the wireless power transfer circuit.

The wireless power transfer circuit comprises a tuned wireless power transfer circuit, and the method further comprises operating the tuned wireless power transfer circuit to receive or transfer power wirelessly at a frequency that is not the tuned frequency of the tuned wireless power transfer circuit.

The controllable power converter is switched to provide a controlled reactance to compensate for variations in reactance seen at an input to the wireless power transfer circuit while the wireless power transfer circuit is receiving power wirelessly from, or transferring power wirelessly to, another wireless power transfer circuit.

The controllable power converter is switched to provide a controlled resistance.

The method can include switching the controllable power converter to minimise or cancel an impedance seen at an input to the wireless power transfer circuit.

The controllable power converter is switched to control a phase angle of the controllable power converter to thereby provide a controlled reactance.

Controlling the phase angle of the converter comprises controlling the angle between the AC voltage across the converter and the AC current into or out of the converter.

The variations in reactance seen at the input to the wireless power transfer circuit are introduced by at least one of: receiving power wirelessly from, or transferring power wirelessly to, another wireless power transfer circuit; transferring power to a load supplied by the wireless power transfer circuit.

The method further comprises monitoring an output voltage or current of the wireless power transfer circuit and switching the controllable power converter to control the output voltage or current.

The controllable power converter is switched to control the resistance seen at the input to the wireless power transfer circuit.

The controllable power converter can be used to control the resistance seen at the input to the wireless power transfer circuit to thereby control a power transferred to the wireless power transfer, or to control a power transferred to the output.

A phase angle of the controllable power converter is controlled over a phase angle range to thereby provide a range of controlled reactance to compensate for a range of variations in reactance seen at the input to the wireless power transfer circuit.

The method further comprises switching the controllable power converter such that the reactance seen at the input to the wireless power transfer circuit is minimally inductive.

The controllable power converter can be switched such that the power transferred by the wireless power transfer circuit remains substantially constant over a two-fold change in voltage across a power transfer coil of the wireless power transfer circuit.

The controllable power converter is controlled such that the power factor at the input to the wireless power transfer circuit remains substantially constant over a two-fold change in voltage across a power transfer coil of the wireless power transfer circuit.

The controllable power converter can compensate for variations in the level of charge of a battery that is charged from the output.

The method further comprises monitoring a voltage output or current output of the wireless power transfer circuit, switching a switch of the controllable power converter to control a reactance of the controlled power converter power transfer circuit to provide a required voltage output or current output.

In another aspect a wireless power transfer circuit is provided comprising a compensation network, a controllable power converter connected to the compensation network, the controllable power converter being configured to supply a load and to provide a controlled reactance, which controlled reactance in combination with the reactance of the compensation network substantially compensates for variations in reactance seen at an input to the wireless power transfer circuit.

The compensation network comprises a first sub-network and a second sub-network, the first sub-network comprising a power transfer coil, and wherein the reactance of the first sub-network is substantially cancelled by the combined reactance of the second sub-network and the controlled reactance of the controllable power converter.

The wireless power transfer circuit comprises a pick-up circuit and the reactance seen at the input comprises a reactance seen by a primary circuit.

The wireless power transfer circuit comprises a primary circuit and the reactance seen at the input comprises a reactance seen by a power source connected to the controllable power converter.

The controlled reactance is provided by controlling a phase angle of the controllable power converter.

The controlled power converter is configured to control the power received by the power transfer circuit.

The controlled power converter is configured to control the power provided to a load supplied by the wireless power transfer circuit.

The controlled power converter is configured to control the phase angle to provide a range of controlled reactance.

The controlled power converter comprises one or more switches which are opened or closed to control the phase angle.

The first sub-network comprises a first branch of the compensation network and the second sub-network comprises a second branch of the compensation network.

The second sub-network comprises a third branch of the compensation network.

In another aspect a wireless power transfer circuit is provided comprising a compensation network comprising a first sub-network and a second sub-network, the first sub-network comprising a power transfer coil, a controllable power converter connected to the compensation network, the controllable power converter being configured to supply a load and to provide a controlled reactance, wherein the reactance of the first sub-network is substantially cancelled by the combined reactance of the second sub-network and the controlled reactance of the controllable power converter.

The combined reactance of the first compensation network and the power transfer coil is substantially cancelled by the combined reactance of the second compensation network and the controlled reactance of the controllable power converter for a range of power provided to the load.

The controllable power converter is configured to provide a reactance which in combination with the compensation network make an input impedance to the circuit appear to be substantially resistive and/or minimally inductive.

A controller may be provided, being configured to control a phase angle of the controllable power converter.

The controller may be configured to control the phase angle of the controllable power converter to control an input reactance to the circuit.

The controller may be configured to control the phase angle of the controllable power converter to control input resistance to the circuit.

The controllable power converter may be configured to control the real power provided to the load.

In another aspect a wireless power transfer circuit is provided comprising
a power transfer coil;
a compensation network comprising a first reactive element and a second reactive element connected in parallel;
a controllable power converter connected in series with the second reactive element;
wherein the controllable power converter is configured such that the combined impedance of the controllable power converter and the second reactive element substantially balances the impedance of the first reactive element.

In another aspect an impedance compression method is provided for a wireless power transfer circuit having a power transfer coil, a compensation circuit and a controllable power converter having an output to supply a load, the method comprising:

monitoring a power output of the wireless power transfer circuit, controlling a phase angle of the power converter to vary a reactance of the power converter to controllably vary an impedance in parallel with a branch of the compensation network whereby the magnitude of the change in load is reduced as seen from an input to the power transfer circuit.

In another aspect, a method is provided comprising a resonant inductive power pickup receiving power wirelessly from an inductive power primary, operating a power converter to rectify power received from the inductive power primary for supply to a load that is connected to the resonant inductive power pickup, and concurrently controlling the power converter to create a controlled reactance that substantially compensates for variability in the coupling with the inductive power transfer primary and/or changes in the load supplied by the power converter.

The method comprises controlling the power converter to create a controlled reactance that substantially offsets a variable uncompensated reactance caused by the coupling with the inductive power transfer primary.

The method comprises controlling the power converter to create a controlled reactance that substantially offsets a variable uncompensated reactance caused by changes in the load supplied by the power converter.

The method comprises dynamically controlling a phase angle between a voltage across the converter and a current through the converter, concurrently with rectifying power for supply to the load, to adapt to changes in the load seen by the resonant inductive power pickup.

The method comprises dynamically controlling a phase angle between a voltage across the converter and a current through the converter, concurrently with rectifying power for supply to the load, to create a controlled reactance that substantially compensates for variability in the coupling with the inductive power transfer primary and changes in the load supplied by the power converter.

The method comprises controlling the power converter to correct a power factor between the inductive power transfer primary and the resonant inductive power pickup, wherein the power converter is controlled to introduce a controlled reactance that produces near unity power factor.

The method comprises controlling the power converter to concurrently regulate the power supplied to the load and control an impedance reflected, by the resonant inductive power pickup, onto the inductive power transfer primary.

The method comprises controlling the power supplied to the load to regulate the charge in a battery connected to the resonant inductive power pickup.

The method comprises controlling the power converter to substantially eliminate a reactive component of the reflected impedance.

The method comprises controlling the power supplied to the load to regulate the charge in a battery connected to the resonant inductive power pickup, and controlling the power converter to substantially eliminate a reactive component of the reflected impedance.

In another aspect a method is provided comprising a resonant inductive power transfer circuit transferring power wirelessly to or from another resonant inductive power transfer circuit, operating a power converter to condition power received from the inductive power primary for supply to a load that is connected to the resonant inductive power transfer circuit, and concurrently controlling the power converter to create a controlled reactance that substantially compensates for variability in the coupling with the other resonant inductive power transfer circuit and/or changes in the load supplied by the power converter.

The method comprises controlling the power converter to create a controlled reactance that substantially offsets a variable uncompensated reactance caused by the coupling with the other inductive power transfer circuit.

The method comprises controlling the power converter to create a controlled reactance that substantially offsets a variable uncompensated reactance caused by changes in the load supplied by the power converter.

The method comprises dynamically controlling a phase angle between a voltage across the converter and a current through the converter, concurrently with rectifying power for supply to the load, to adapt to changes in the load seen by the other resonant inductive power transfer circuit.

In another aspect, the new methods or systems can be broadly summarised as,

Active impedance compression: Where the functionality of a TMN is integrated with a ZCN by using one or more switches to actively control the effective load impedance presented across the ZCN and therefore regulate the power flow. The ZCN may also be tuned somewhat differently to further optimise the performance.

Active impedance matching: A TMN is replaced with an active rectifier that is connected at the output of a compensation network. To operate this new system as a TMN, it uses an inductor-capacitor-reactance (LCX) network as opposed to a traditional LCL, parallel or series compensation network. The X component of the new LCX network is configured to aid TMN-like operation while the phase of an active-rectifier relative to its current, and magnitude of voltage generated by the active-rectifier is modulated, to actively control the impedance of the load branch thus regulating power flow.

In another aspect this disclosure provides an active impedance compression circuit for a wireless power transfer primary or secondary, the circuit comprising:
an inductive element and a capacitive element,
a bridge operatively connected to the inductive and capacitive elements, the bridge having at least one active switch, and
a controller to control the at least one switch to actively control the effective load impedance presented across the impedance compression circuit.

In another aspect this disclosure provides a method for controlling power flow in a wireless power transfer primary or secondary, the method comprising:
controlling at least one switch of a bridge to actively control an effective load impedance presented across an impedance compression circuit in order to control power flow.

The impedance compression circuit may comprise a compensation network.

In one aspect this disclosure provides an active impedance matching circuit for a wireless power transfer primary or secondary, the circuit comprising:
an inductor-capacitor-reactance (LCX) network,
an active rectifier, and
a controller to control phase of the rectifier to actively control the circuit impedance.

The LCX network may comprise an LCL network.

In another aspect this disclosure provides an active impedance matching circuit for a wireless power transfer primary or secondary, the circuit comprising:
an inductor-capacitor-reactance (LCX) network,
an active rectifier, and
a controller to modulate rectifier voltage to actively control the circuit impedance.

Control of the circuit impedance may comprise control of an input impedance of the circuit.

Preferably the active rectifier comprises a controlled power converter.

In another aspect this disclosure provides a method for controlling power flow in a wireless power transfer primary or secondary, the method comprising:
controlling the X component of an LCX network to provide a tuned matching network and thus control power flow.

Preferably the LCX network comprises an LCL network.

Preferably the phase of an active-rectifier relative to its current is also controlled.

Preferably the magnitude of voltage generated by the active-rectifier is modulated.

Preferably the method includes controlling one or more of the above to actively control the impedance and thus regulate power flow.

In another aspect this disclosure provides a pick-up comprising a pick-up coil, a tuning capacitor connected to the pick-up, and a rectifier comprising at least one switch, wherein the pick-up is configured to switch the rectifier to control the impedance reflected from the pick-up to a primary.

Preferably the reflected impedance is controlled to be minimised.

The pick-up can be configured to switch the rectifier to: compensate for resistive changes in the pick-up, and/or to modulate the rms voltage across the rectifier, and/or to compensate for the charge level of a battery in the pick-up circuit, and/or to compensate for the coupling factor between the pick-up and the primary, and/or compensate for misalignment of the pick-up coil with a primary coil, and/or to control a phase angle between the voltage across the rectifier and the current through the rectifier.

In some embodiments the pick-up does not include: a tuneable matching network, and/or a variable reactance network connected between the pick-up coil and the rectifier, and/or a passive impedance compression network.

Preferably the pick-up comprises a compensation network, the tuning capacitor is part of the compensation network, and the rectifier is connected to the output of the compensation network. In some embodiments, the pick-up is configured to short circuit the rectifier to control the reflected impedance. In some embodiments, the rectifier comprises a bridge with at least two diodes.

In another aspect this disclosure provides a method for controlling the impedance reflected from a wireless pick-up to a wireless primary, the method comprising receiving power wirelessly from the wireless primary, rectifying the received power from the wireless primary, with a rectifier, for delivery to a load, and controlling the rectifier to modulate the impedance reflected back to the primary coil.

In some embodiments, the method comprises controlling the phase angle between the current through the rectifier and the voltage across the rectifier to modulate the impedance reflected back to the primary coil, and/or controlling the rms voltage across the rectifier to modulate the impedance reflected back to the primary coil. Preferably the method comprises switching at least one switch within the rectifier to short circuit the rectifier circuit.

As used herein the term "and/or" means "and" or "or", or both. As used herein "(s)" following a noun means the plural and/or singular forms of the noun. The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner. It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7). The entire disclosures of all applications, patents and publications, cited above and below, if any, are hereby incorporated by reference.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Other aspects of the invention may become apparent from the following description which is given by way of example only and with reference to the accompanying drawings.

DRAWING DESCRIPTION

Examples or embodiments are described below with reference to the drawings in which.

DETAILED DESCRIPTION

This document discloses techniques that can be used to actively control the effective impedance of a WPT circuit, such as a primary or secondary power transfer circuit, or system in order to regulate power flow. These techniques include tuning the primary and/or pick-up compensation networks to facilitate active impedance matching, without significantly impacting the tuning of the system while operating at a fixed frequency. The phase of the voltage produced by the controlled power converter with respect to the current through the power converter (i.e. the power converter phase angle) is adjusted to create a controllable impedance, and in particular a controllable reactance. This controllable impedance, together with an appropriately tuned compensation network, allows control of the power flow while operating at a fixed frequency and without significantly impacting the tuning of the system. The new technique not only removes a conversion stage, but also can significantly improve efficiency by lowering conduction losses in the power converter and also facilitating soft-switching.

The examples provided in this disclosure are largely directed to implementing a method and system for active impedance control implemented via a pick-up or secondary circuit of a wireless power transfer system. However, it will be understood by a person of ordinary skill in the art that the method or system may equally be performed on a primary circuit of a WPT/IPT system, or across both primary and secondary circuits.

As described above, with prior art circuits, power factor is an issue. With the active impedance control of the present disclosure, power factor issues are addressed since impedance, specifically reactance, compensation allows a predominantly or solely resistive load to be seen looking into the circuit, so the power factor is essential unitary as the voltage and current appear, or are, in phase.

Figure 1:
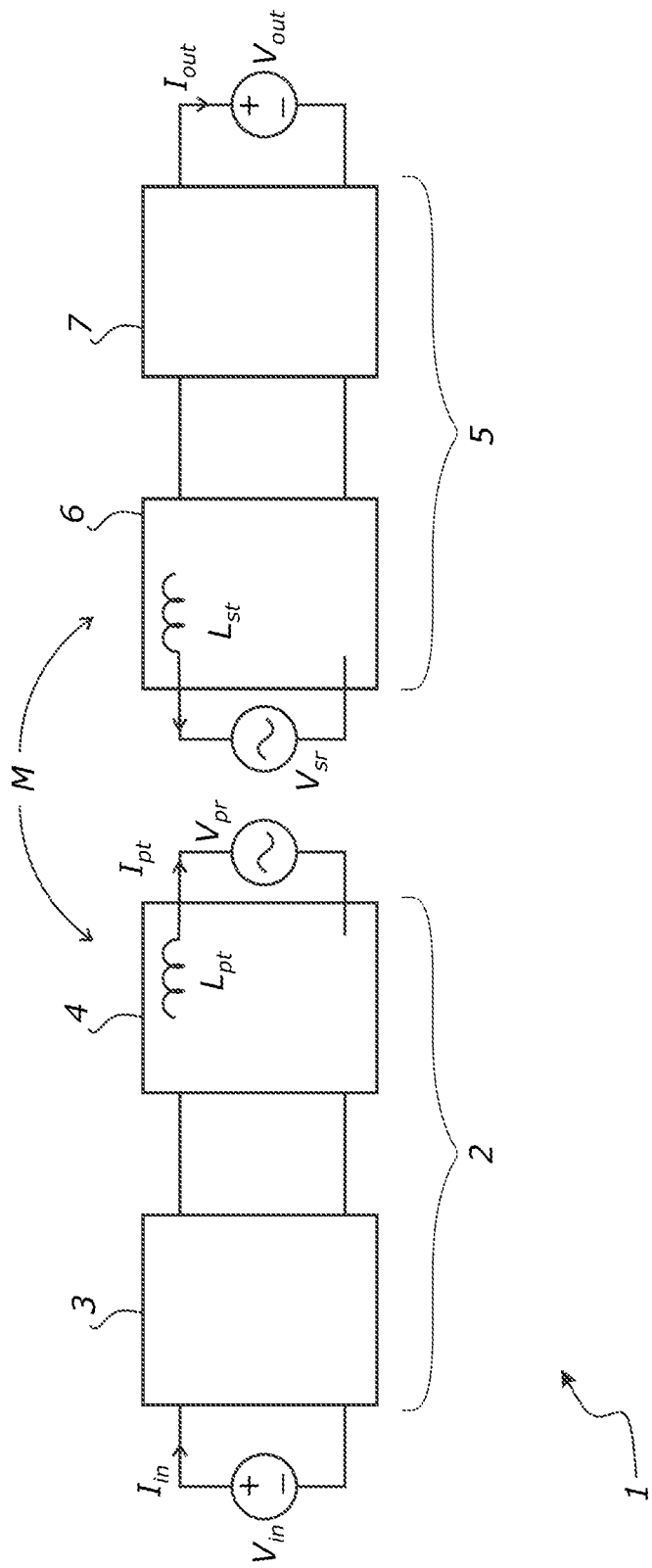
FIG. 1 shows a schematic diagram of an IPT system.

A typical WPT/IPT system is shown in FIG. 1, generally referenced 1, in which the primary circuit 2 has a power converter 3 connected between a DC source (or load) Vin and a compensation network 4 which includes a power transfer coil Lpt. Similarly, the pick-up or secondary circuit 5 has a compensation network 6 including a power transfer coil Lst, and a power converter 7 which is also connected to a load (or source) Vout.

Figure 3:
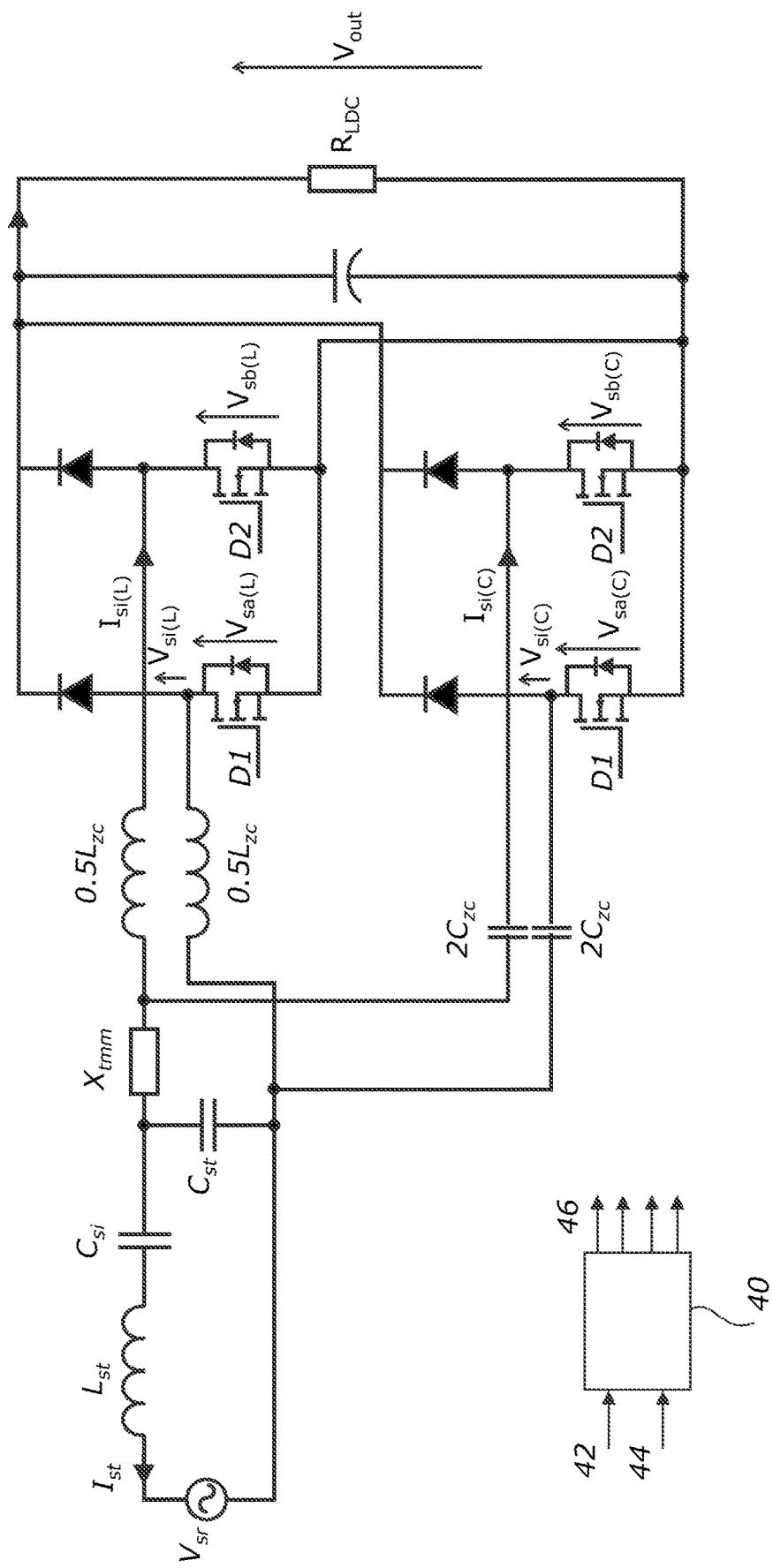
FIG. 3 shows an IPT system pick-up having a controlled power converter with 2 switches.
Figure 4:
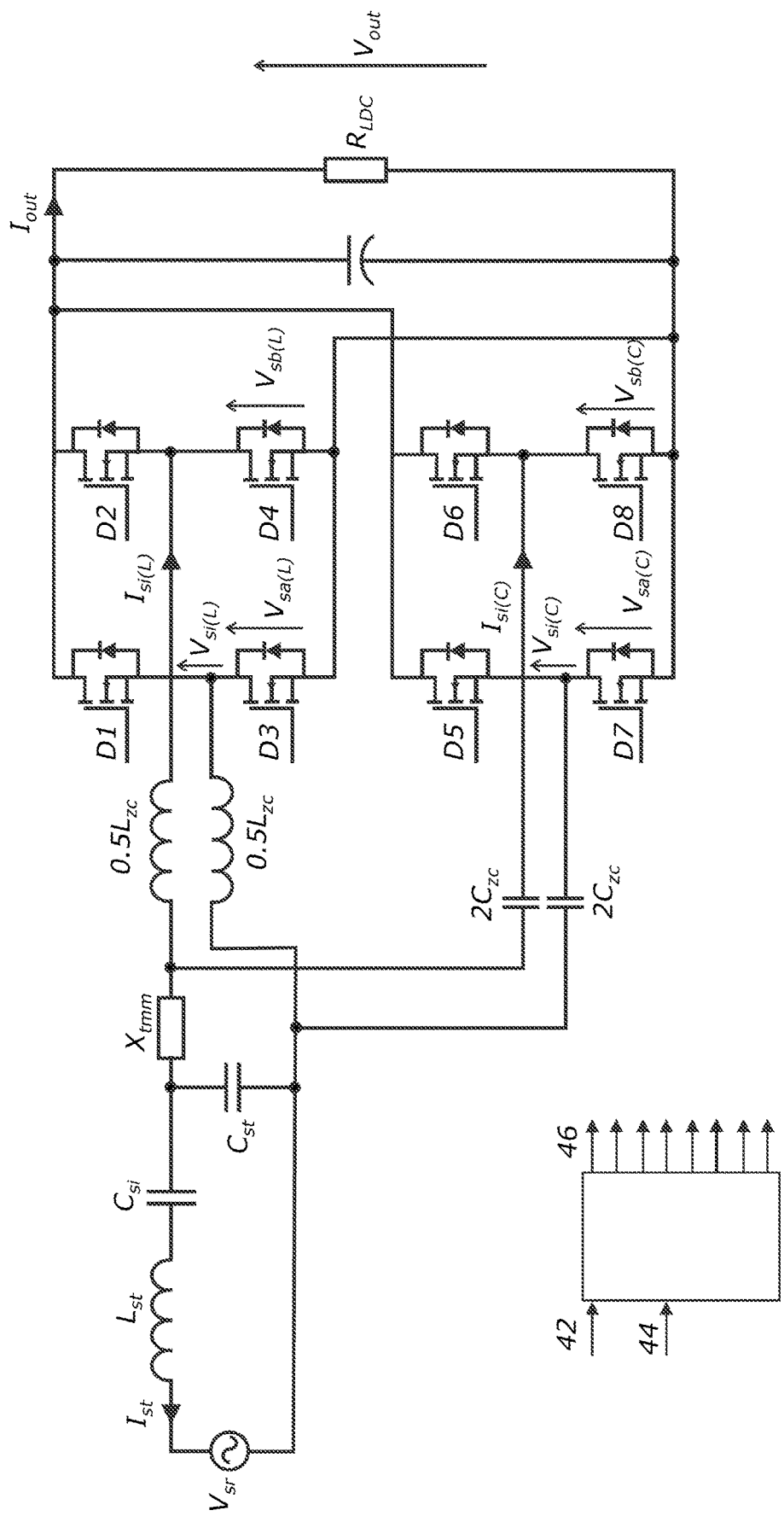
FIG. 4 shows an IPT system pick-up having a controlled power converter with 4 switches.
Figure 5:
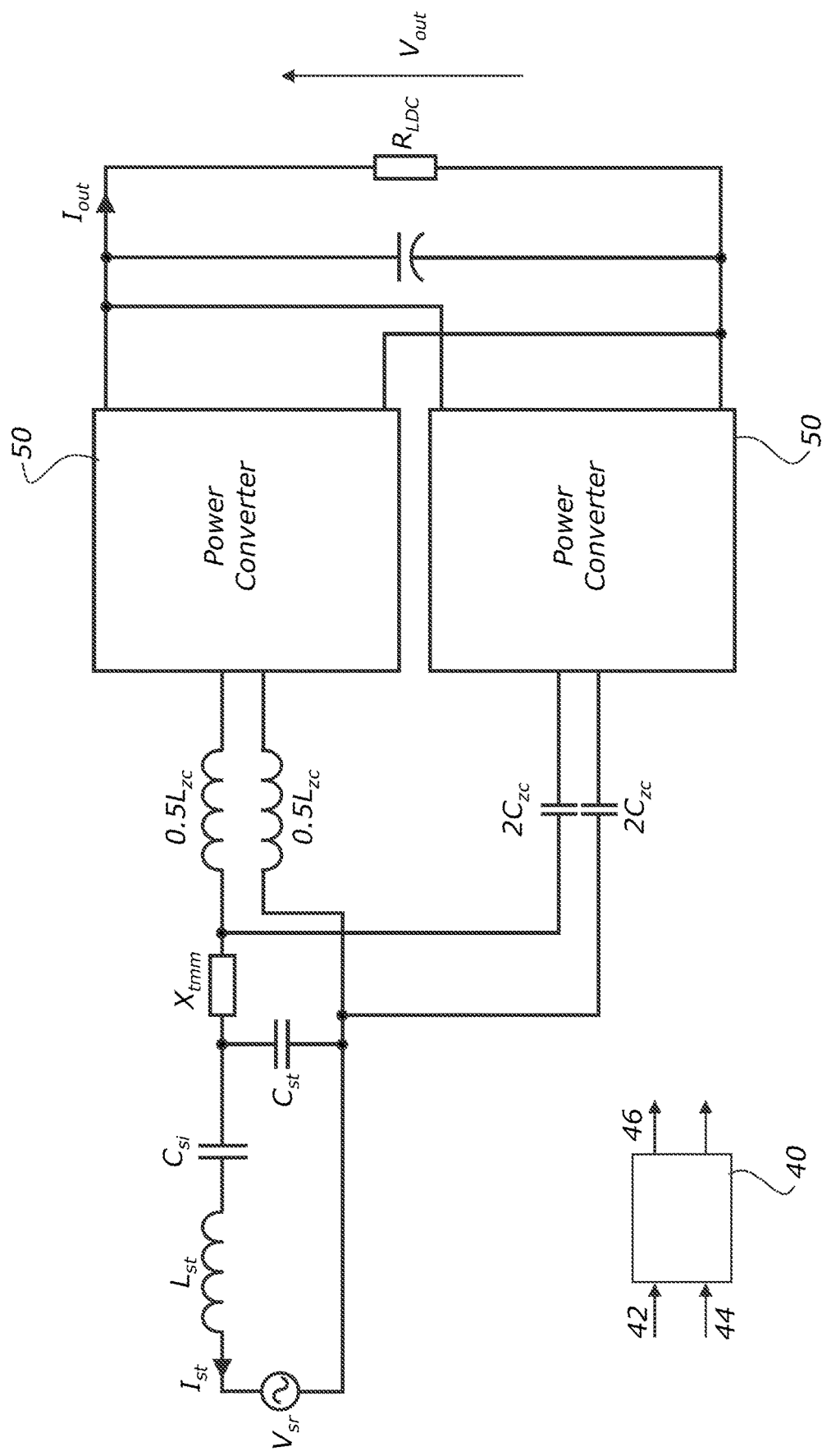
FIG. 5 shows an IPT system pick-up having an Active Compression Network Using a generic power converter arrangement.

This disclosure presents a number of illustrative configurations for circuits that include compensation networks and controlled power converters which allow control of the circuit impedance. FIGS. 2-5 show circuits in which the controlled power converter has a different configuration: one with only one diode replaced with a switch as in FIG. 2; one with two diodes replaced with switches as in FIG. 1; and one with all four diodes replaced as in FIG. 4. Alternatively, any other power converter can be used, as shown in FIG. 5.

Therefore, reference to a controlled power converter in this document may include a number of separate controllable converters.

A controlled power converter, in this document, includes a switch converter that can be controlled, such as a controlled rectifier. A controlled power converter also includes a half or full bridge converter, as well as any other topologies referred to or disclosed herein.

Figure 2:
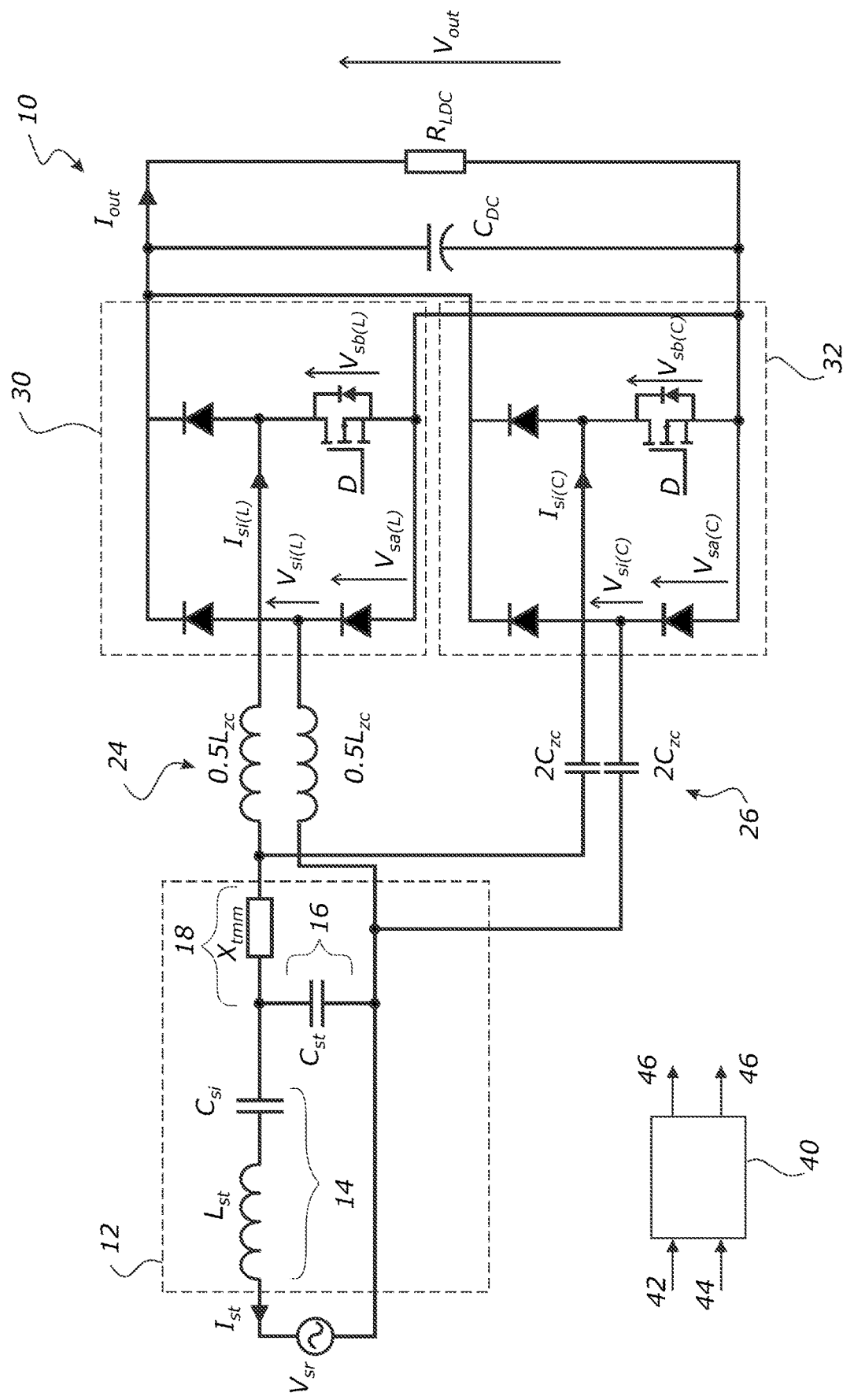
FIG. 2 shows an IPT system pick-up having a controlled power converter with one switch.

In FIG. 2, a pick-up (or secondary) WPT circuit is shown, generally referenced 10. Vsr represents the voltage induced in power transfer coil Lst by a time varying magnetic field, generated from a primary WPT circuit for example. Lst, Csi, Cst and Xtmn form a known LCL topology compensation network. First branch 14 of the network is predominantly or entirely inductive, second branch 16 is predominantly or entirely capacitive and third branch 18 is predominantly or entirely inductive. In the example shown, branch 18 may comprise a TMN, however in other embodiments it may simply comprise an inductor, or an inductor and series connected capacitor for example. The compensation network has a first loop comprising first branch 14 and second branch 16. It has a second loop comprising second branch 16, third branch 18 and the components connected to that branch including the controlled power converter.

In prior art topologies, the compensation network 12 is typically connected to a power converter such as a rectifier, which may be controlled to provide Vout. However, in this example the output of the LCL compensation network is connected to power converters 30 and 32 via Lzc and Czc. It will be seen that the topology in this example, and in other examples such as FIGS. 2-4, provides for electrical energy from compensation network 2 to be supplied to the load $R_{LDC}$ (including DC filter capacitor $C_{DC}$) through:

a) a first output branch 24 comprising $L_{zc}$ and controlled power converter 30; and b) a second output branch 26 comprising $C_{zc}$ and controlled power converter 32.

Branches 14 and 16 are provided in parallel with each other. Inductance $L_{zc}$ is implemented in this example using two discrete inductors which each have an inductance of $0.5L_{zc}$. The series connection of the two inductors presents a total inductance of $L_{zc}$. Similarly, Capacitance $C_{zc}$ is implemented in this example using two discrete capacitors which each have a capacitance of 2Czc. The series connection of the two capacitors presents a total capacitance of $C_{zc}$.

The rectifiers 30 and 32 are controlled to provide both the controlled DC output Vout, and the impedance of the circuit by actively controlling the branches 24 and 26.

It will be seen that the circuits of FIGS. 2-4 may be expressed by the equivalent circuit shown in FIG. 5 in which the power converters are generally referenced 50. The different configurations of FIGS. 2-4 offer varied cost, control complexity, control freedom and effectiveness. The duty cycle of the power converter switches can be controlled to vary Lzc, Czc, RLac and RCac in order to regulate the power flow. The phase angle of the or each controlled power converter can be controlled to regulate the impedance of the impedance of the circuit as it appears at Vsr, i.e. as it appears to a primary circuit which is wirelessly supplying power to the circuits of FIGS. 2-4.

Figure 7A:
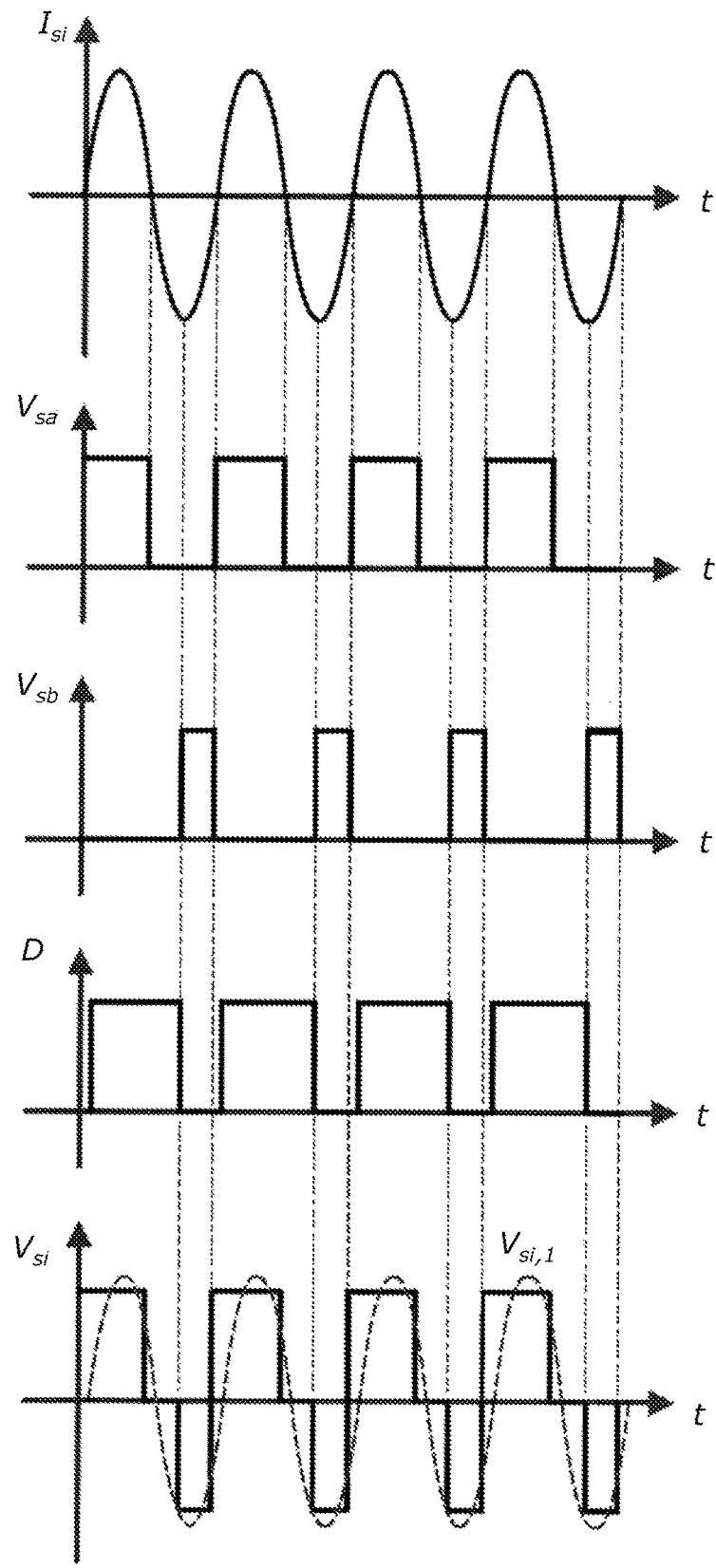
FIG. 7A shows exemplary waveforms for the circuit of FIG. 2 above.

Several exemplary waveforms for the rectifiers that comprise the controlled power converters 30 and 32 of FIG. 1 are shown in FIG. 7A. Each rectifier comprises a bridge circuit. The waveforms demonstrate how the rectifiers can be controlled to regulate the reflected impedance from the pick-up. In the example shown in FIG. 7A, the switches in each of the rectifiers are operated by a controller 40 (for example a microprocessor) to ensure that turn-on occurs at zero voltage (ZVS) and the Vsi waveform lags the Isi waveform by a controllable amount (regulated by the duty cycle of the switches). The controller 40 is shown in FIG. 2, and may comprise inputs 42 and 44 such as Vout and/or Iout and outputs 46 which provide signals to control the switches D.

The first waveform, shown at the top of FIG. 7A, represents the current (Isi) flowing through the rectifiers. The next waveform represents the voltage (Vsa) across the return diode on the left leg of the bridge. The middle waveform represents the voltage across the switch D (that replaces the return diode on the right leg of the bridge). The fourth waveform represents the conducting state of the switch (D). And the final waveform, shown at the bottom of FIG. 7A, represents the voltage across the rectifier (Vsi).

The rectifier current (Isi) is approximated by a sinusoidal waveform. During the first half cycle, current (Isi) enters the rectifier via the left leg of the bridge, flows through the load (RL,dc), and returns via the switch (D). This creates a voltage (Vsa) across the return diode on the left leg of the bridge that corresponds with the positive period of the current (Isi) waveform. The diode voltage (Vsa) is approximated by the square waveform shown immediately below the rectifier current (Isi) waveform in FIG. 7A.

The voltage (Vsb) across the switch (D) is held at zero during the first half of the cycle while the switch (D) is conducting. During the second half of the cycle, the switch (D) is controlled to manipulate the phase angle between the rectifier current (Isi) and the rectifier voltage (Vsi). In FIG. 7A, the switch (D) continues to conduct for a period of time during the second half of the cycle when the current feed to the rectifier (Isi) reverses direction. The switch (D) short-circuits the rectifier during this period. The rectifier current (Isi) enters the rectifier via the right leg of the bridge, flows through the switch (D), and returns via the return diode on the left leg of the bridge.

Partway through the second half of the cycle, the switch (D) is switched to a non-conducting state by the controller. This causes the current (Isi) to flow through the load (RL,dc) and creates a voltage (Vsi) across the rectifier. The controller is configured to operate the switch (D) to manipulate the phase angle between the rectifier current (Isi) and the rectifier voltage (Vsi) and/or the rms voltage across the load. For example, the controller can modulate the time that the rectifier voltage (Vsi) is clamped during the second half of the cycle to control the voltage waveform of the rectifier.

Figure 6:
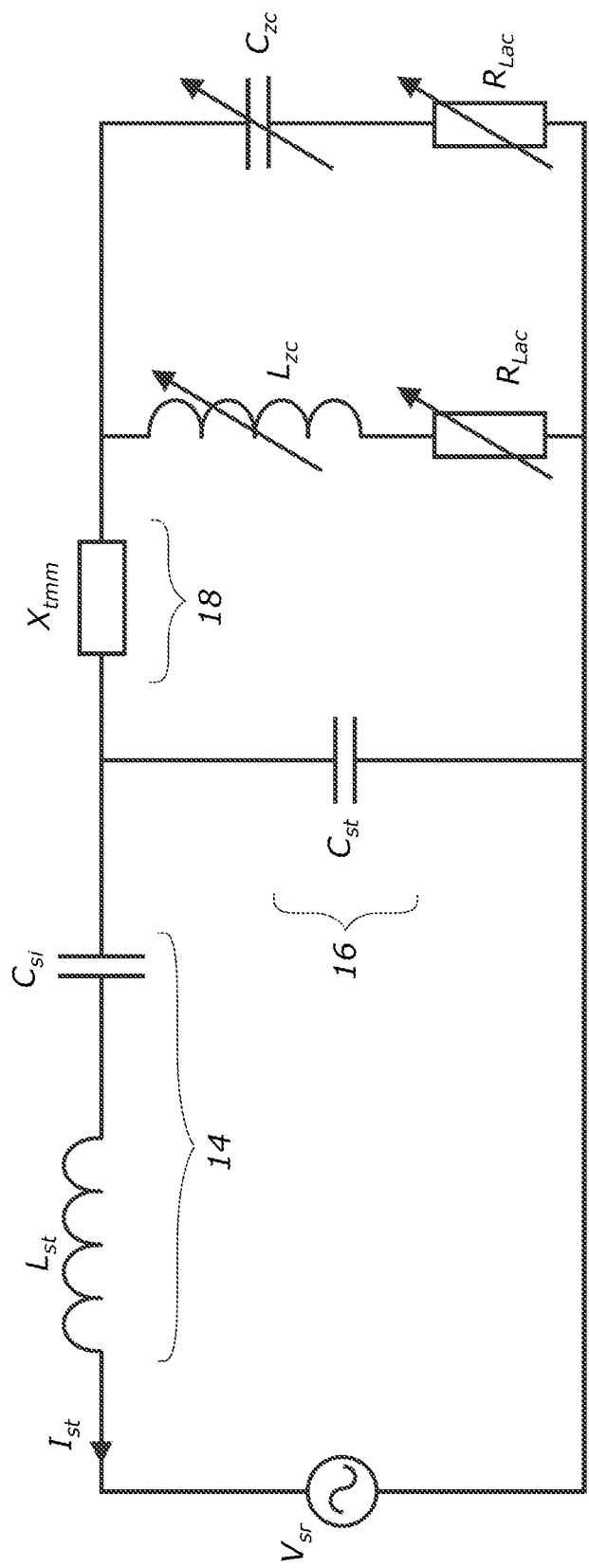
FIG. 6 shows an equivalent circuit for the circuits of FIGS. 2-5.
Figure 7B:
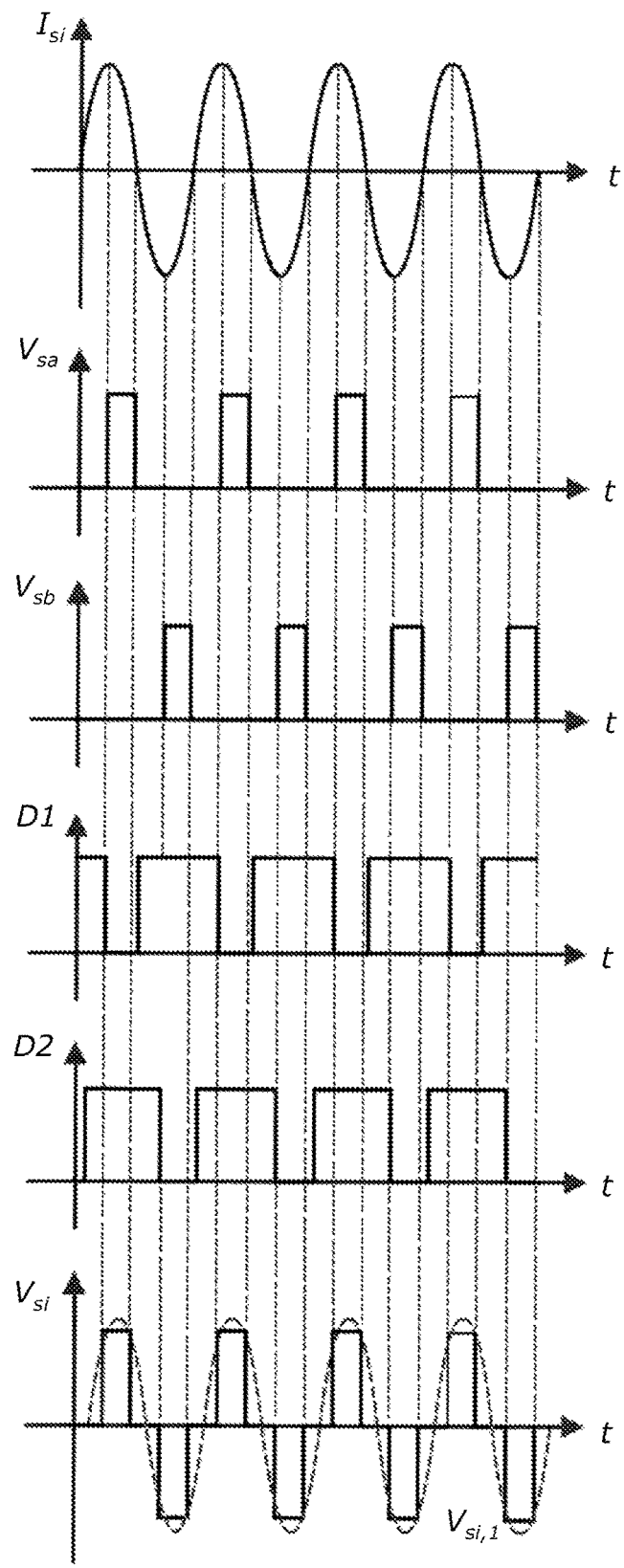
FIG. 7B shows exemplary waveforms for the circuit of FIG. 3 above.
Figure 8:
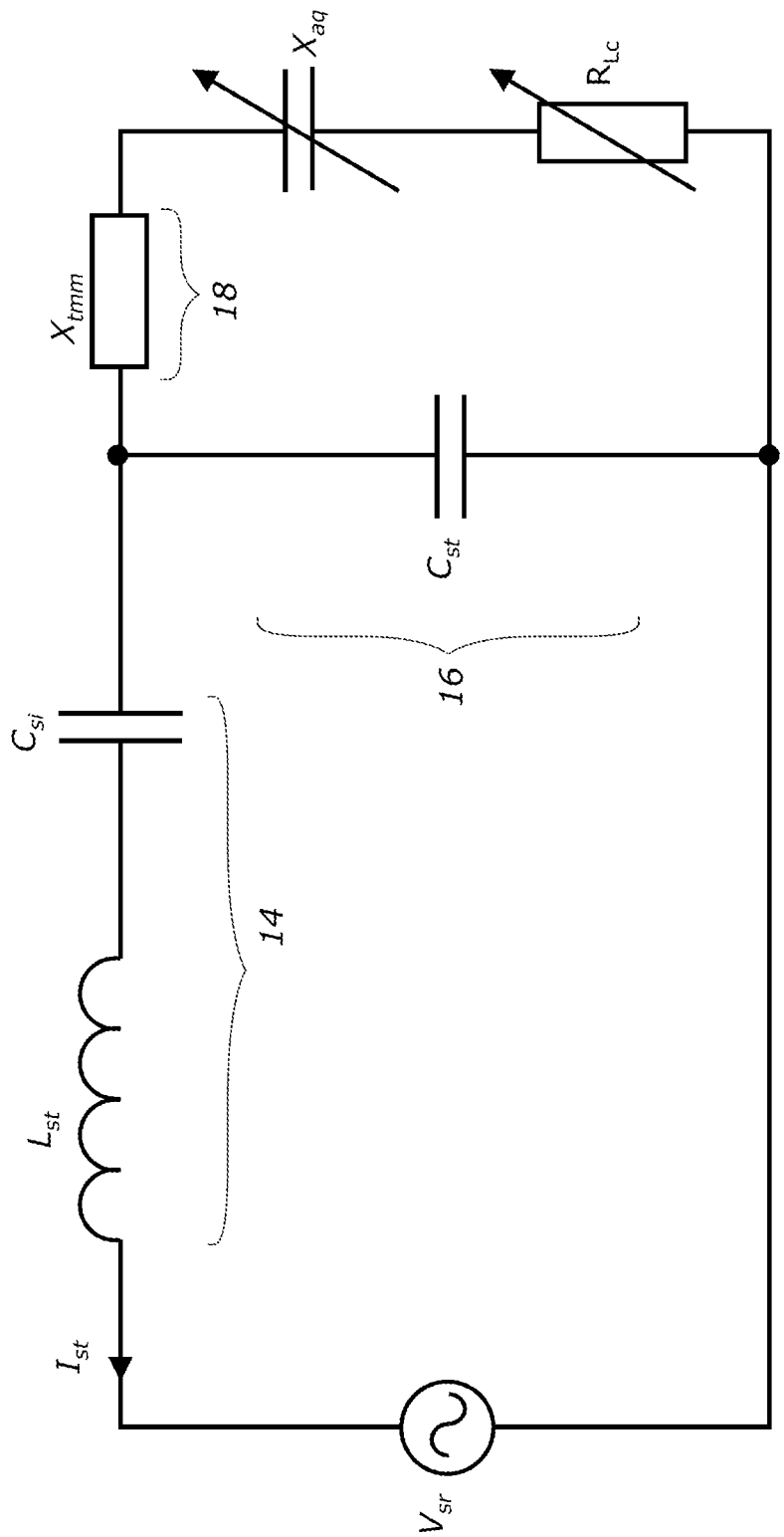
FIG. 8 shows another equivalent circuit for the circuits of FIGS. 2-6.

Example operational waveforms for the two switch rectifiers of FIG. 2 are shown in FIG. 7B. In the example shown in FIG. 7B, the switches in each rectifier are operated by controller 40 (for example a microprocessor) in such a way that ZVS turn-on can be achieved and the Vsi waveform lags the Isi waveform by a controllable amount according to the duty cycle of the switches. Hence, the two rightmost branches in FIG. 6 can be expressed as a controllable capacitance in series with a controllable resistor, as shown in FIG. 8. In addition to the ability to control the power flow by changing the controllable resistor, at a sufficient quality factor Q, this controllable capacitance helps to regulate the power flow to the load whilst maintaining a power factor close to unity.

The first waveform, shown at the top of FIG. 7B, represents the current (Isi) flowing through the rectifiers. The next waveform represents the voltage (Vsa) across the switch (D1) on the left leg of the bridge. The third waveform represents the voltage (Vsb) across the switch (D2) on the right leg of the bridge. The fourth waveform represents the conducting state of the switch (D1). The fifth waveform represents the conducting state of the switch (D2). And the final waveform, shown at the bottom of FIG. 7B, represents the voltage across the rectifier (Vsi).

The rectifier current (Isi) is approximated by a sinusoidal waveform. Initially both switches (D1, D2) are in a conducting state, effectively bypassing the rectifier and introducing a phase difference between the current (Isi) waveform and the voltage (Vsi) waveform. Current (Isi) enters the rectifier via the left leg of the bridge, flows from the left switch (D1) to the right switch (D2), and exits via the right leg of the bridge. The voltage (Vsi) across the rectifier is clamped at zero volts and no power is transferred to the load (RL,dc).

Partway through the first half of the cycle, the left switch (D1) is switched to a non-conducting state by a controller. This causes current (Isi) to flow through the left diode to the load (RL,dc), and return via the right switch (D2). This creates a voltage (Vsa) across the left switch (D1) and the rectifier (Vsi). The switch voltage (Vsa) is approximated by the square waveform shown immediately below the rectifier current (Isi) waveform in FIG. 7B. The rectifier voltage is approximated by the waveform shown at the bottom of FIG. 7B.

The voltage (Vsb) across the right switch (D2) is held at zero during the first half of the cycle. During the second half of the cycle, the right switch (D2) is controlled to manipulate the converter phase angle between the rectifier current (Isi) and the rectifier voltage (Vsi). In FIG. 7B, the right switch (D2) continues to conduct for a period of time during the second half of the cycle when the current feed to the rectifier (Isi) reverses direction. The right switch (D2) short-circuits the rectifier during this period. The rectifier current (Isi) enters the rectifier via the right leg of the bridge, flows through the right switch (D2), and returns via the left switch (D1).

Partway through the second half of the cycle, the right switch (D2) is switched to a non-conducting state by the controller. This causes current (Isi) to flow through the right diode to the load (RL,dc). This creates a voltage (Vsb) across the right switch (D2) and the rectifier (Vsi).

The controller is configured to operate the switches (D1, D2) to manipulate the time during each cycle that the current is fed to the load (RL,dc). For example, the controller can modulate the time that the rectify voltage (Vsi) is clamped during each cycle to control the rms voltage across the load, and/or the phase angle between the rectifier current (Isi) and the rectifier voltage (Vsi).

The ability of the controlled power converter to control the converter phase angle between the rectifier current and voltage (according to the example of a pick-up or secondary as described above) means that the impedance of the converter can be controlled. Therefore, as shown in FIG. 8, Xac can be controlled. The compensation network comprising Cst and the components that are in parallel with Cst (i.e. those components comprising Xtmn, Xac ad $R_{LC}$) comprise a controlled compression impedance network.

Figure 9:
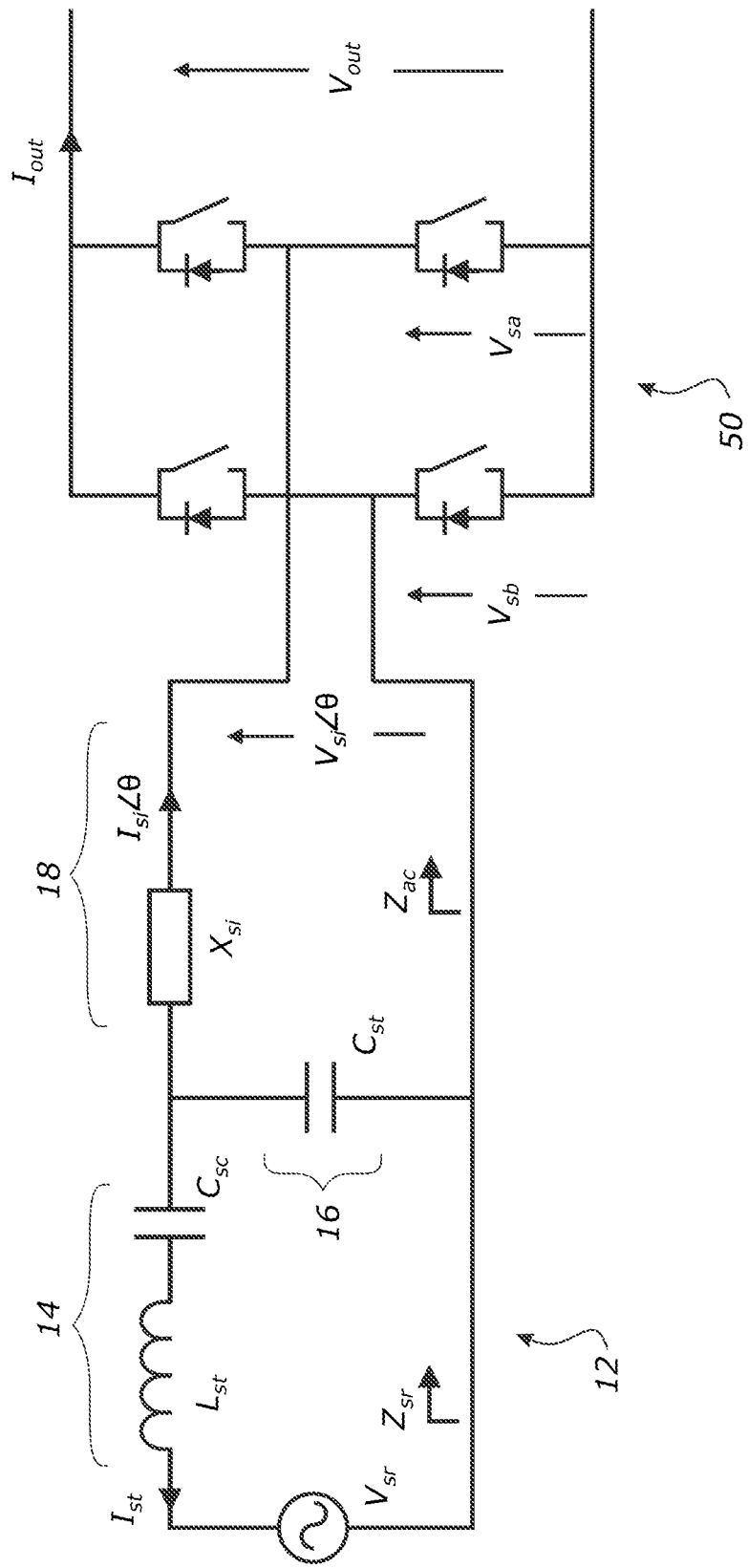
FIG. 9 shows an IPT system pick-up having an active impedance control topology.
Figure 10:
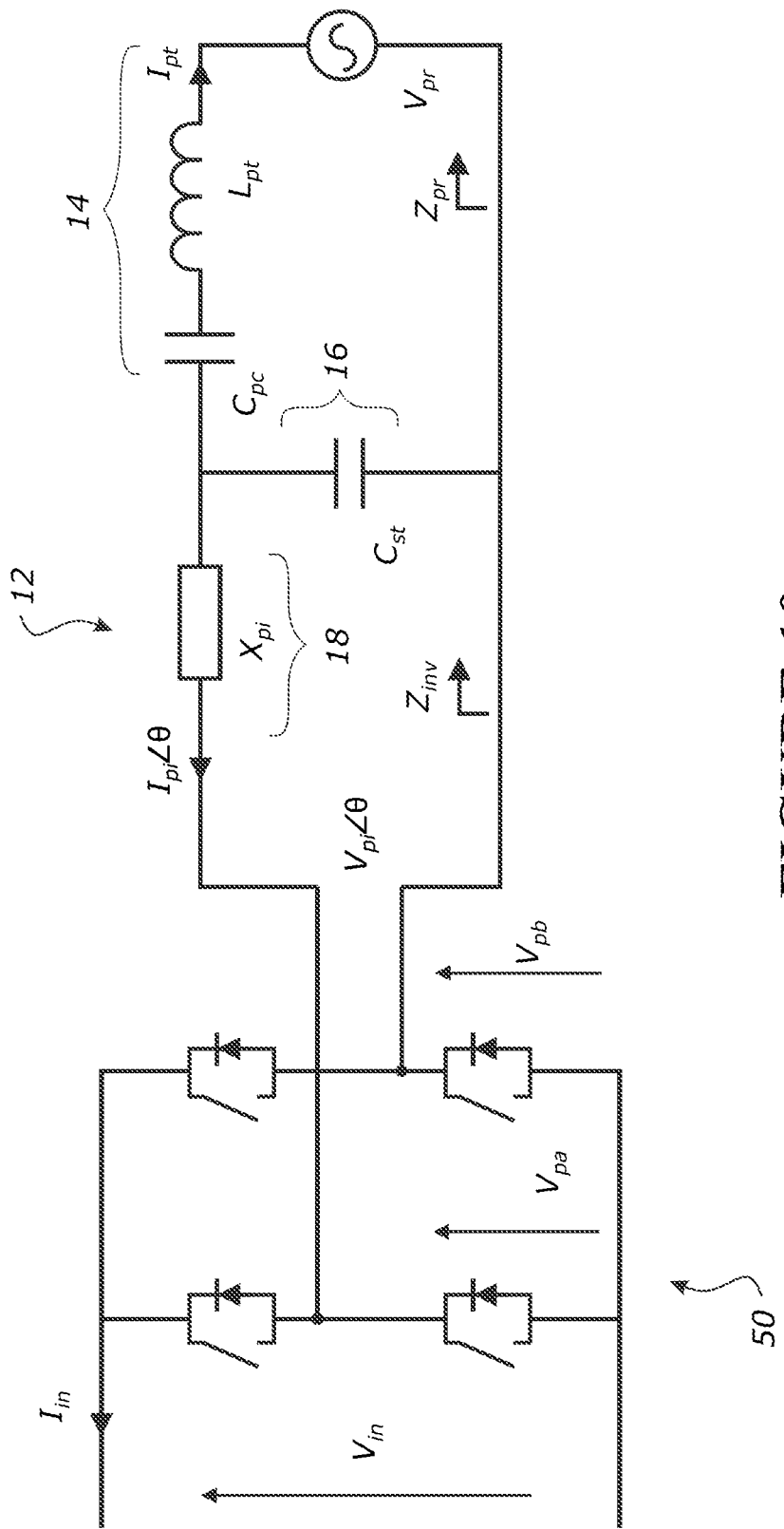
FIG. 10 shows an IPT system primary having an active impedance control topology.
Figure 11:
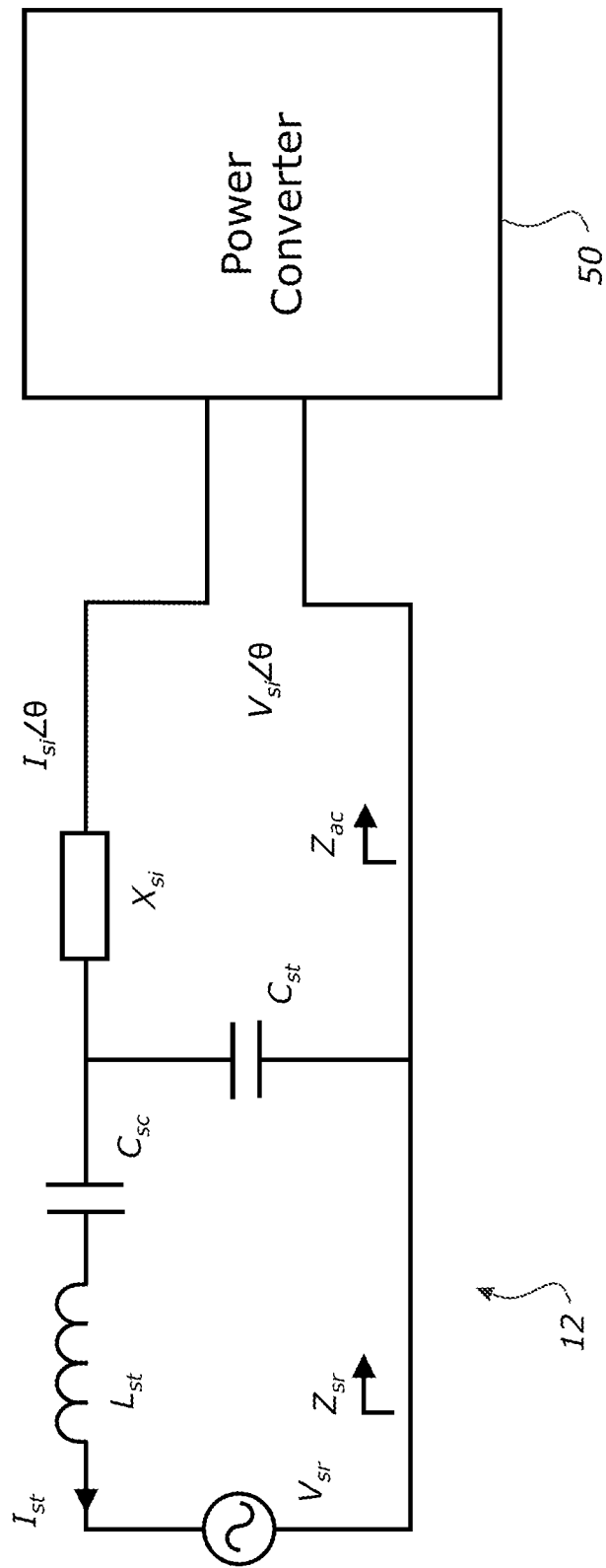
FIG. 11 shows an active impedance control topology in generic form.

The techniques above can be further developed to provide active impedance control or matching, which provides the functional benefits of active compression and tuning but only requires a single inverter after the compensation network. This is shown by the circuits in FIGS. 9-11. In these figures the impedance of the third branch 18 of the compensation network 12 is represented as Xsi. As will be described further below, the reactances in the compensation network are provided so that the reactance of the first branch 14 is substantially cancelled by the combined reactance of the second branch 16, third branch 18 and the controllable power converter. This is described further below. FIG. 9 is an example of a WPT pick-up circuit that can implement the active impedance matching disclosed herein. FIG. 10 is an example of a WPT primary circuit that can implement the active impedance control and/or matching disclosed herein. The controlled power converter used for the circuit of FIG. 9 (or FIG. 10) can take a variety of forms (as suggested in FIGS. 2-4 above) and can thus be represented generically as shown in FIG. 11. For implementation in a primary circuit, such as FIG. 10, the DC input source may be a variable voltage, for example a solar panel, and the load may comprise the power being supplied to a secondary. Therefore, the power converter to which the variable source is connected, and the compensation network can be controlled to control the input impedance which in this example is the impedance seen by the variable input power source.

Figure 12:
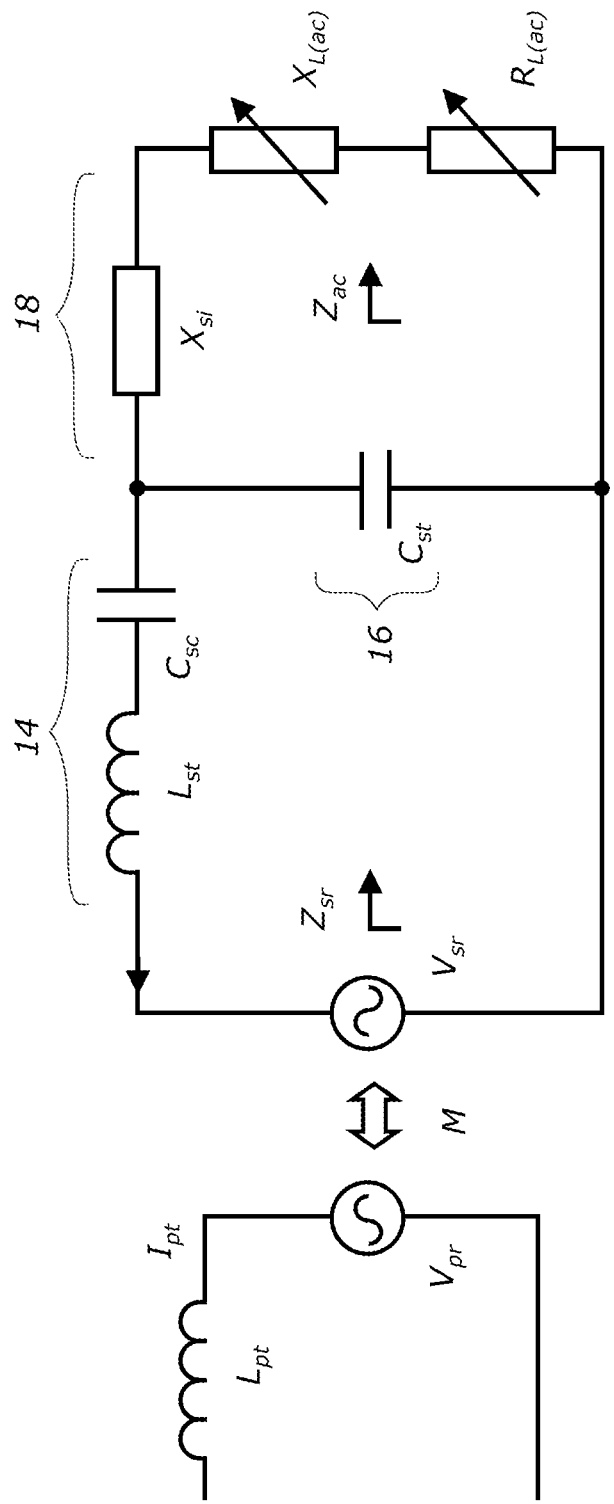
FIG. 12 is an active impedance control equivalent circuit.

The principle of operation is based on that described above in that the power converter is operated such that the converter and load appear as a variable reactance and a resistor, as shown in FIG. 12. Again, this is achieved by making the Vsi waveform lag/lead the Isi waveform, effectively controlling the phase angle of the converter.

It is helpful to construct a model of the circuit as an example to illustrate the circuit design and functionality to the skilled addressee.

Figure 13:
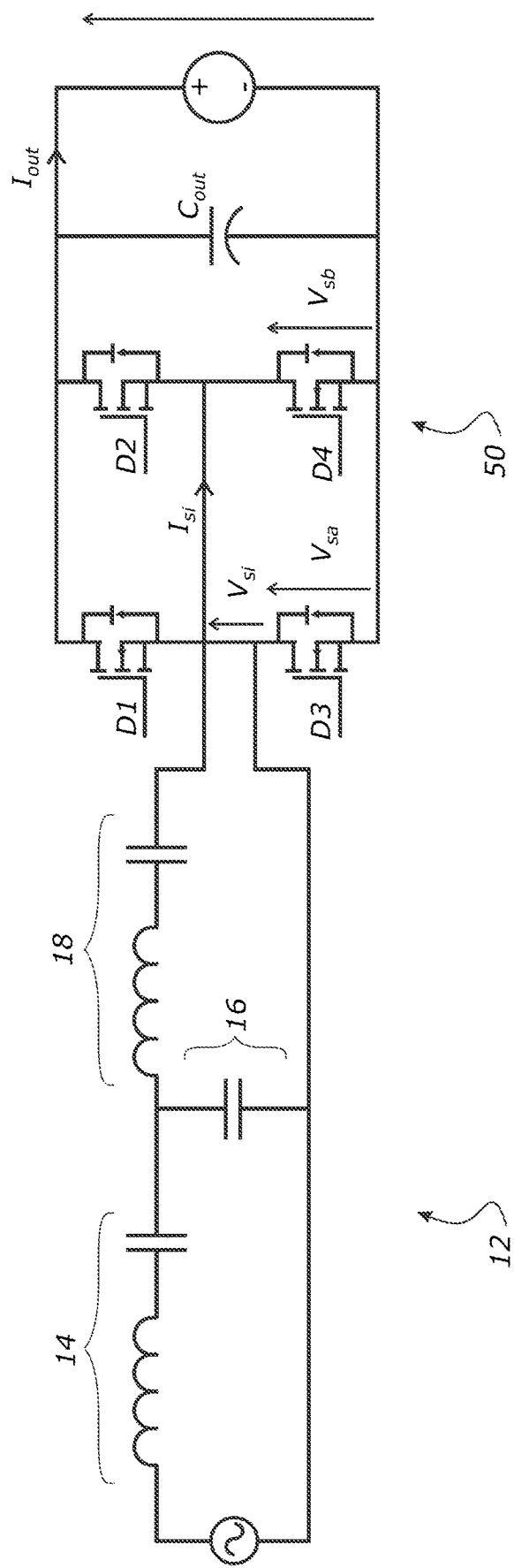
FIG. 13 shows a pick-up circuit which may be operated to provide a controlled impedance.
Figure 14:
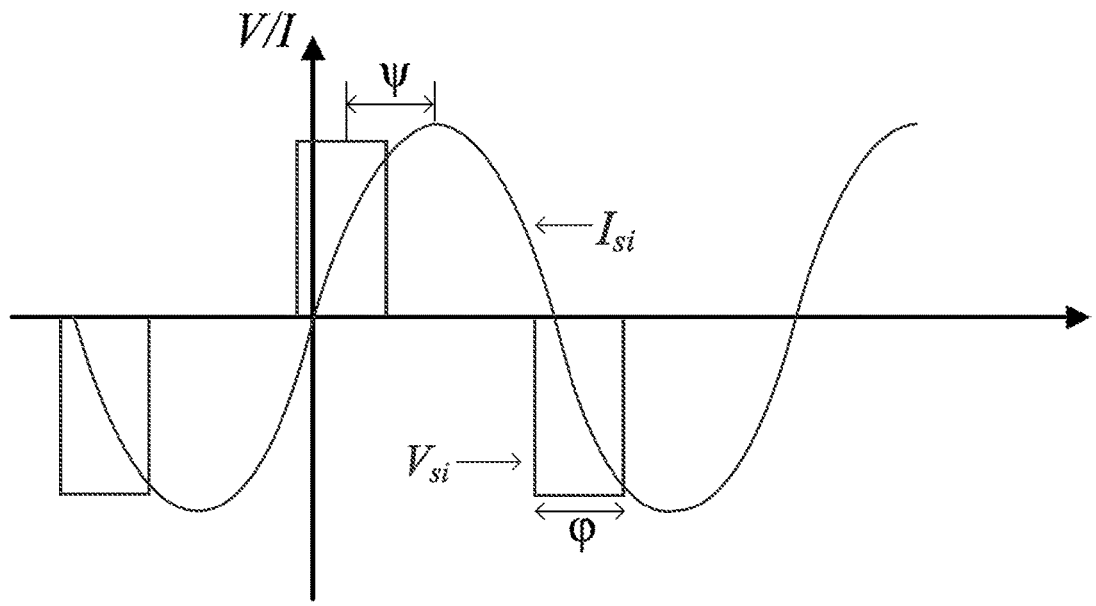
FIG. 14 shows voltage and current waveforms for the controlled power converter of FIG. 13.

The full-bridge converter in FIG. 13 is controlled using the variables $\phi$ and $\psi$, as defined in FIG. 14. Variable $\phi$ corresponds to the duty cycle of the controllable power converter. Variable $\psi$ is the angle between the voltage and current of the controllable converter and is thus the phase angle of the converter. This angle is controllable by control of the converter switch or switches as described by way of example above using controller 40.

It follows that the square wave voltage across the converter input is given by $$V_{si} = V_{out} \frac{4}{\pi} \sum_{n=1,3,...}^{\infty} \frac{\sin(n\varphi/2)}{n} \cos(n\omega t + n\psi) \quad (5)$$

Using (5) and by assuming the converter is 100% efficient, it can be shown that $$I_{out} = \frac{2\sqrt{2}}{\pi} I_{si,rms} \sin(\varphi/2) \cos(\psi) \quad (6)$$

Using (6) and by again assuming the converter is 100% efficient, it can be shown that $$R_{ac} = \frac{8}{\pi^2} \sin^2(\varphi/2) \cos^2(\psi) R_{out} \quad (7)$$

where Rac is the real part of the impedance of the converter and battery. If Xac is defined as the imaginary part of the same impedance, it can be said that $$X_{ac} = \frac{V_{si,1,rms} \sin(\psi)}{I_{si,rms}} \quad (8)$$

Substituting (5) and (6) into (8) results in $$X_{ac} = \frac{8}{\pi^2} \sin^2(\varphi/2) \cos(\psi) \sin(\psi) R_{out} \quad (9)$$

Figure 15:
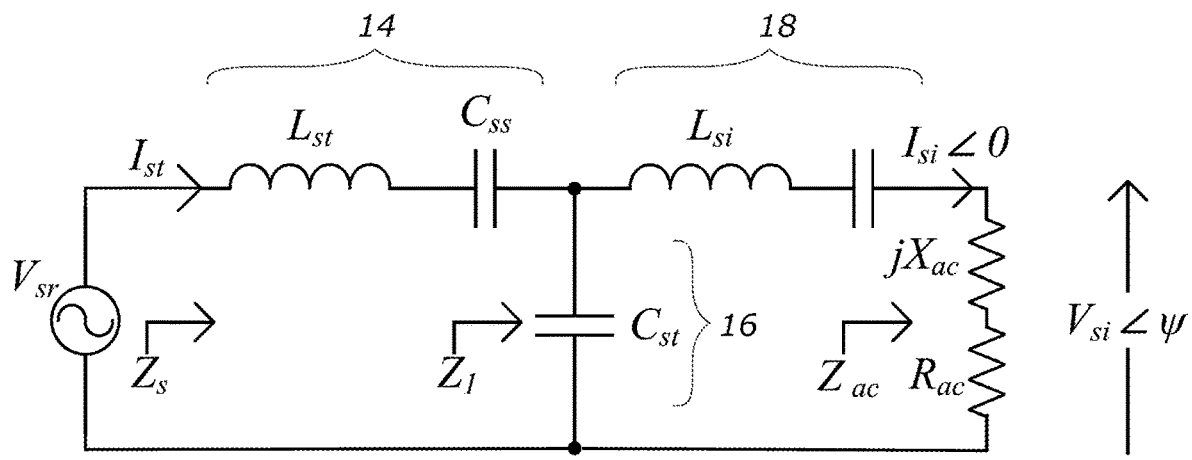
FIG. 15 shows another equivalent circuit for the circuit of FIG. 13.

In summary, the battery and full-bridge converter shown in FIG. 13 can be represented as an impedance with a real and imaginary component, as illustrated by FIG. 15.

Using the equivalent circuit in FIG. 15 and by defining $X_{eq} = \omega L_{si} - 1/(\omega C_{si}) + X_{ac}$;

the combined impedance of Cst, Lsi, the converter and the load is given by $$\text{Re}\{Z_1\} = \frac{R_{ac}}{(1 - \omega C_{st,p} X_{eq})^2 + \omega^2 C_{st,p}^2 R_{ac}^2} \quad (10)$$

and $$\text{Im}\{Z_1\} = \frac{X_{eq}(1 - \omega C_{st,p} X_{eq}) - \omega C_{st,p} R_{ac}^2}{(1 - \omega C_{st,p} X_{eq})^2 + \omega^2 C_{st,p}^2 R_{ac}^2} \quad (11)$$

In addition, the total impedance seen by the induced voltage is given by $$Z_s = j\omega L_{st} + \frac{1}{j\omega C_{st,s}} + \text{Re}\{Z_1\} + \text{Im}\{Z_1\} \quad (12)$$

Therefore, the circuit can be tuned for a given set of operating conditions by choosing Lst and Cst,s such that their combined impedance is equal to the value of Im$\{Z_1\}$ at those operating conditions. When this is the case, (12) reduces to $$Z_s \approx \text{Re}\{Z_1\} \quad (13)$$

Figure 16A:
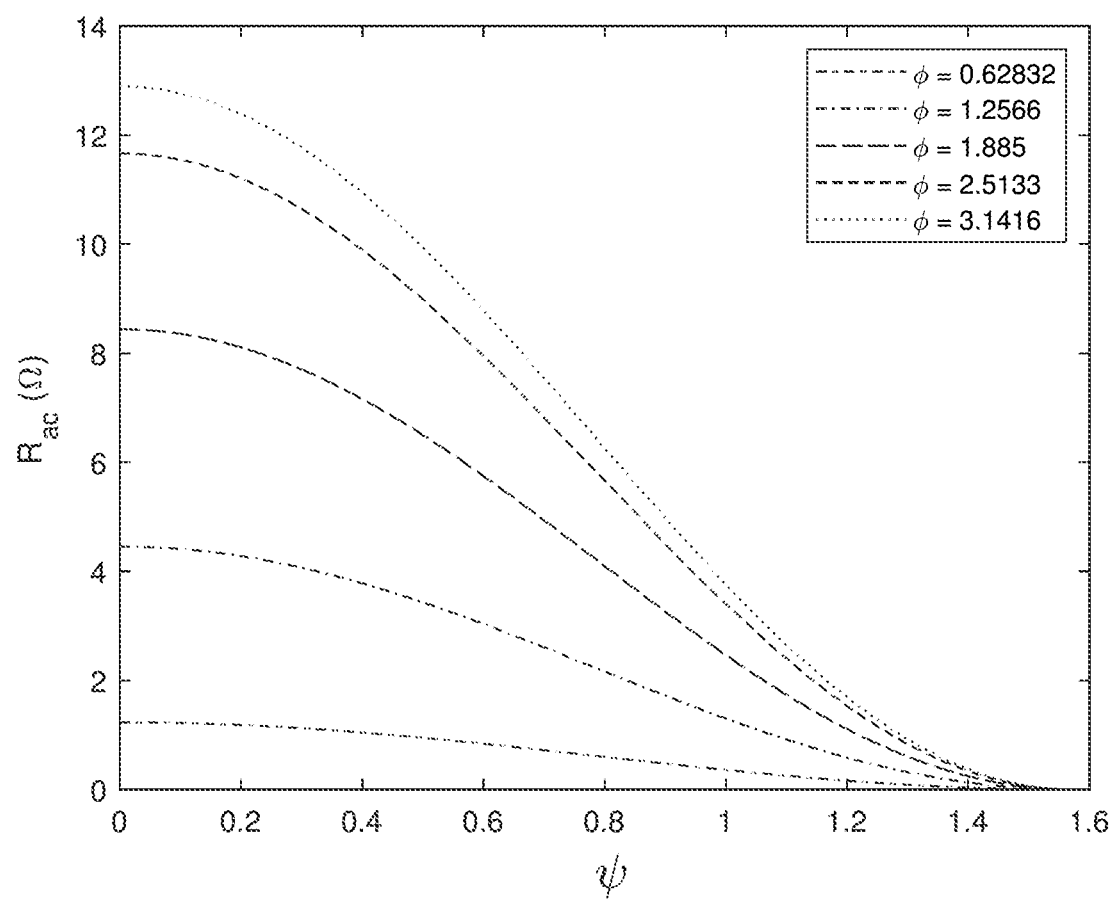
FIG. 16A shows a graph of the real component of impedance $Z_{ac}$ vs. $\psi$ & $\phi$ with $V_{out}$=350 V & $P_{out}$=7700 kW.
Figure 16B:
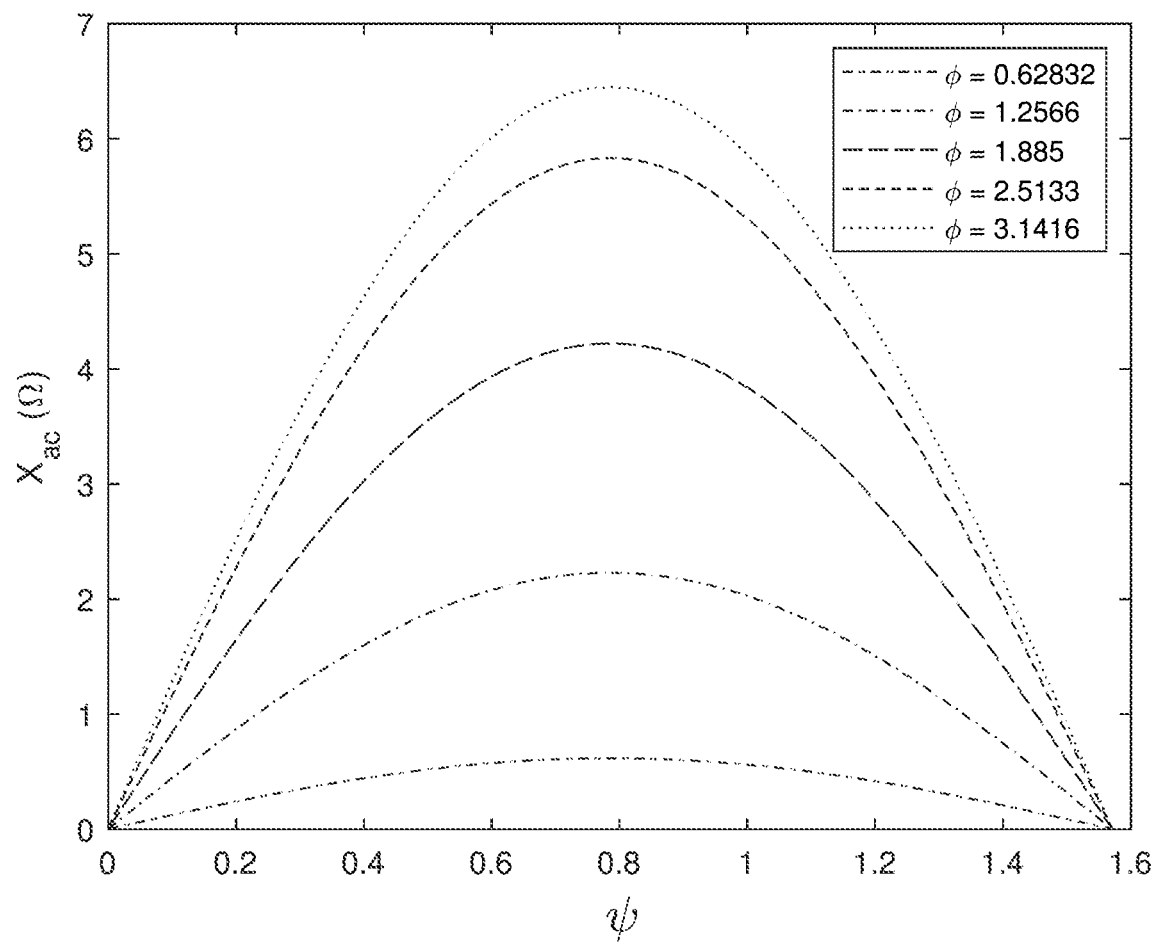
FIG. 16B shows the imaginary (reactive) component of impedance Zac vs. ψ & φ with Vout=350 V & Pout=7700 kW.

The variable capacitance or inductance of a TMN is emulated using (7) and (9) for a fixed load (e.g. battery) voltage. Ideally, $\psi$ can be varied with a fixed duty cycle $\phi$ in order to vary Xac with minimal change in Rac. For most values of battery voltage and output power, a fixed $\phi$ of $\pi$ creates the largest variation in Xac with respect to iv, and therefore essentially functions as a TMN. Using a $\phi$ of $\pi$ does, however, tend to produce the largest variation in Rac. The real and imaginary components of impedance for values of $\phi$ and $\psi$ are shown in FIGS. 16A and 16B.

From (7 and 10) it can be seen that Reg$\{Z_1\}$ can be controlled by adjusting $\psi$. Therefore, according to (13), the real power delivered to the secondary can be controlled by $\psi$ via Re$\{Z_1\}$, and is given by $$\text{Re}\{P_{sr}\} = \frac{|V_{sr}^2|}{\text{Re}\{Z_s\}} = \frac{|V_{sr}^2|}{\text{Re}\{Z_1\}} \quad (14)$$

Therefore, it can be seen that control of the phase angle $\psi$ of the controllable power converter (for example converter 50 in FIG. 13), in conjunction with the compensation network, allows active control of the impedance of the power transfer circuit. This in turn allows control of the converter phase angle to control the real power delivered to the power transfer circuit, and thus the power made available to the load.

The compensation network may be considered as two sub-networks. The first sub-network comprises the first branch 14, and the second sub-network comprises the second branch 16 and third branch 18. From (12) it can be seen that making the sub-network of the compensation circuit 12 have a reactance (or impedance) that at least ameliorates, or cancels, the combined reactance (or impedance) of the second sub-network in combination with the reactance of the controllable power converter allows active control of the impedance of the power transfer circuit.

This is achieved by using the compensation network and the power converter to partially or wholly cancel the power transfer circuit reactance. Thus, in the example of a secondary circuit, the impedance looking into the circuit is substantially or completely resistive. As explained further below the power transfer circuit can be designed to achieve this over a range of phase angle operation of the power converter.

Unlike conventional compensation networks which are tuned for resonance at the frequency at which power is transferred wirelessly, it can be seen that the compensation network herein is tuned to allow for a reactance of the controlled power converter.

It will also be seen that control of the reactance (or impedance) of the controlled power converter allows impedance compression to be implemented using LCL networks as disclosed herein (or variants of those networks). The second and third branches (i.e. branches 16 and 18 of the compensation network 12 are in parallel with each other. The third branch effectively has the impedance of the controlled power converter 50 and the load R) in series with it. As the load changes, the converter phase angle can be controlled to balance the overall impedance of the third branch 18 and its series connected elements to match or balance the impedance of the second branch 16. Since the branches are in parallel the effect of the change in the load is diminished or reduced when see looking into the power transfer circuit. Therefore, if the impedance compression is implemented in a secondary power transfer circuit as shown in FIG. 13, then the effect of a change is load supplied by the secondary is reduced as seen by a primary circuit which is supplying power to that secondary circuit.

To validate the foregoing, a 7.7 kW system has been designed. Due to the large number of variables in (10) and (11), the values of the passive elements were found graphically. It will be understood by the skilled addressee that the models provided above present sufficient information to select component values for a given set of required operating conditions, and the methodology below is but one illustrative example.

The real and imaginary components of $Z_1$ were plotted against $\psi$ for different combinations of Lsi and Cst. These combinations were then assessed against a set of criteria. First, there needs to be a range of $\psi$ for which $\text{Im}\{Zs\}$ is as flat as possible. This is helped by placing the range around the turning point of the curve to capitalise on the inherently lower gradients there, as shown in FIG. 17B. Second, for that range, it is desirable for the variation in $\text{Re}\{Zs\}$ to be as large as possible. Third, there needs to be a value of $\text{Im}\{Zs\}$ in the operating range that does not exceed the impedance of the available power transfer coil. Otherwise, there is no value of Cst,s that will result in zero $\text{Im}\{Zs\}$.

To select Cst,s, its combined impedance with Lst should equal the lowest value of $\text{Im}\{Zs\}$. This results in $\text{Im}\{Zs\}$ being minimally inductive across the whole operating range. This in turn translates to an inductive load seen at the primary inverter output and soft switching of the primary switches. Additionally, this selection method ensures the point with the lowest value of $\text{Re}\{Z_1\}$ (point F in FIGS. 17A and 17B) is fully tuned. This is relevant because the same amount of mistuning would result in a lower power factor at this point.

Restricting the values of $\psi$ to the closed interval $(-\pi/2, 0)$ keeps Xac and thus Zac inductive from the perspective of the rectifier. Doing this ensures ZVS turn off for all secondary switches. The selected parameters are summarised in Table 1.

TABLE 1

Summary of Selected Parameters

| Parameter | Value |
|---|---|
| $\phi$ | $\pi$ |
| $L_{si}$ | 90 μH |
| $C_{st}$ | 100 nF |
| $L_{st}$ | 53.83 μH |
| $V_{out}$ | 350 V |
| $P_{out}$ | 7700 W |

The system was modelled in LTspice by replacing the converter and battery with a sinusoidal voltage source equal to the fundamental component of $V_{si}$. The variable $\psi$ was controlled indirectly by changing e, defined as the angle between $V_{sr}$ and $V_{si}$.

The predicted impedances of the selected operating points are shown in FIG. 17 and the corresponding simulation data in Table 2. The model has been subsequently refined by representing the battery and converter with a square wave source. FIGS. 18A and 18B show simulated waveforms for operating points A and F using the refined model.

Figure 17A:
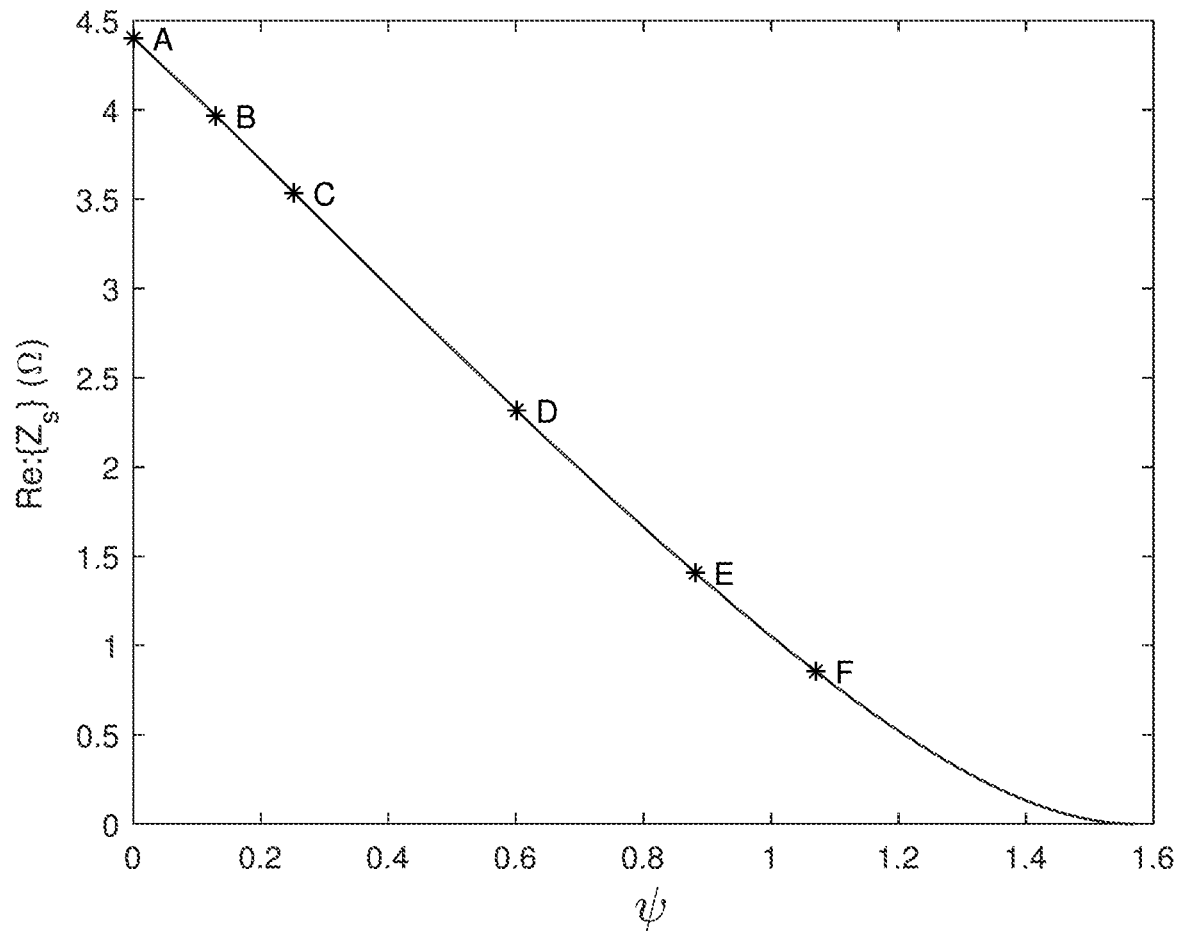
FIG. 17A shows the real component of impedance Zs vs. ψ with φ=π, Vout=350 V & Pout=7700 kW.
Figure 17B:
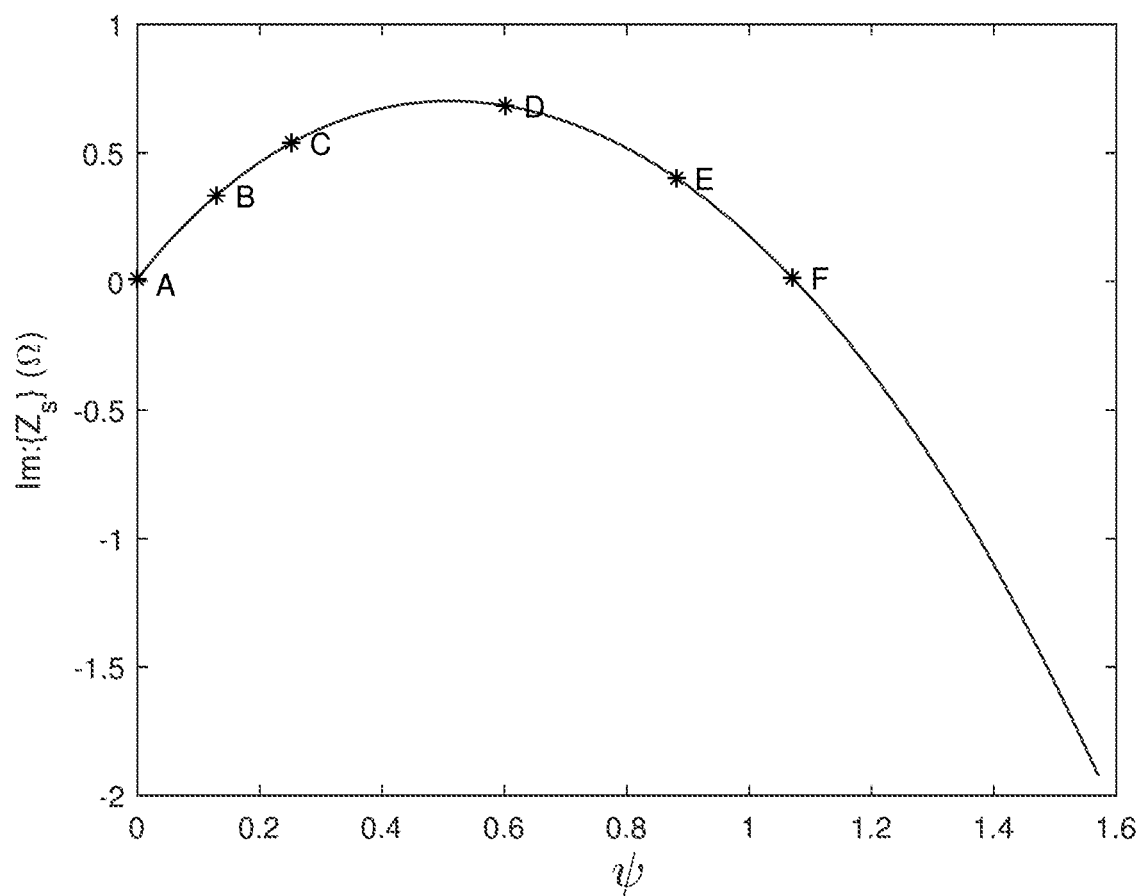
FIG. 17B shows the imaginary component of impedance Zs vs. ψ with φ=π, Vout=350 V & Pout=7700 kW.
Figure 18A:
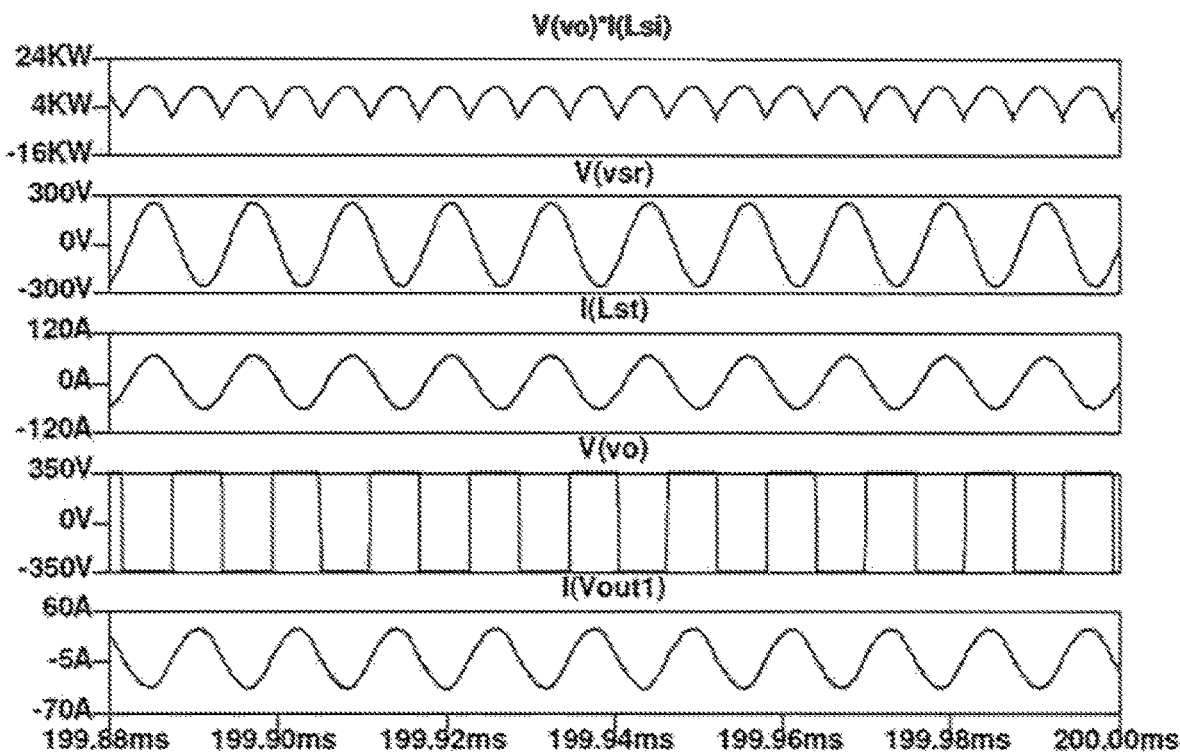
FIG. 18A shows simulated waveforms at operating point A of FIGS. 17A and 17B.
Figure 18B:
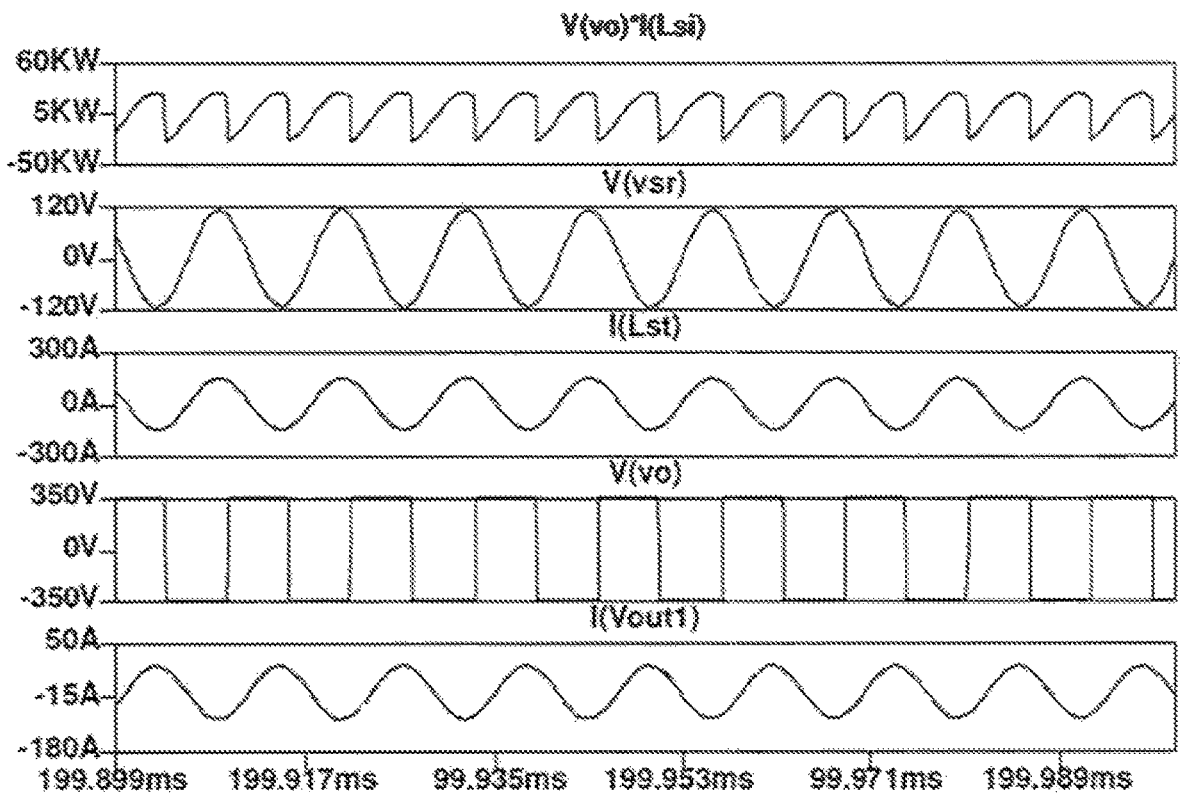
FIG. 18B shows simulated waveforms at operating point F of FIGS. 17A and 17B.

The simulations show the system can tolerate a 2.27-fold voltage change between operating points A and F of FIGS. 17A and 17B with near-unity power factor (PF) (from the perspective of $V_{sr}$) for all operating points. They also show good agreement with the mathematical models for most of the points tested, with the exception of point D. At this point, 7700 W was achieved at a $\psi$ value 0.03 radians different from predicted. Additionally, for many of the unlabelled points between C & D and D & E, there was no $\psi$ value that would yield 7700 kW. It is suggested that this is because $L_{st}$ and $C_{st,s}$ are detuned from $C_{st,p}$, resulting in a reverse current being generated through $L_{si}$.

From (14), having a large variation in $\text{Re}\{Z_1\}$ with respect to $\psi$ is desirable, as it means that the system is able to handle large changes in $V_{sr}$. However, increasing the variation in $\text{Re}\{Z_1\}$ also increases the variation in $\text{Im}\{Z_1\}$, resulting in greater detuning as $\psi$ is controlled.

Therefore, the values of $L_{si}$ and $C_{st,p}$, that is, the variables that $\text{Re}\{Z_1\}$ depends on that are set, should be chosen carefully.

TABLE 2

Summary of Results

| Op. | Pt. Meas. $\psi$ (r) | $P_{si}$ (W) | $V_{sr,pk}$ (V) | $I_{st,rms}$ (A) | $I_{si,rms}$ (A) | PF |
|---|---|---|---|---|---|---|
| A | 0.00 | 7695 | 259.72 | 41.19 | 24.36 | 1 |
| B | 0.13 | 7765 | 247.26 | 44.62 | 24.91 | 1 |
| C | 0.25 | 7651 | 233.81 | 47.05 | 25.28 | 0.99 |
| D | 0.64 | 7752 | 189.32 | 60.52 | 31.11 | 0.96 |
| E | 0.88 | 7690 | 147.36 | 76.56 | 39.91 | 0.97 |
| F | 1.07 | 7635 | 114.41 | 94.81 | 50.86 | 1 |

Control for the various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few. The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A method of controlling a tuned wireless power transfer circuit comprising a compensation network and a controllable power converter connected to at least one of a first output branch or a second output branch of the compensation network, the method comprising:

switching the controllable power converter to provide a controlled reactance, which controlled reactance in combination with the reactance of the compensation network substantially compensates for variations in reactance seen at an input to the wireless power transfer circuit; and operating the tuned wireless power transfer circuit to receive or transfer power wirelessly at a frequency that is not the tuned frequency of the tuned wireless power transfer circuit.

2. The method of claim 1 further comprising switching the controllable power converter to provide a controlled reactance via at least one of the first output branch or the second output branch to compensate for variations in reactance seen at an input to the wireless power transfer circuit while the wireless power transfer circuit is receiving power wirelessly from, or transferring power wirelessly to, another wireless power transfer circuit.

3. The method claim 1 further comprising switching the controllable power converter to provide a controlled resistance.

4. The method of claim 1 further comprising switching the controllable power converter to at least one of minimize or cancel an impedance seen at an input to the wireless power transfer circuit.

5. The method of claim 1 further comprising switching the controllable power converter to control an angle between the AC voltage across the converter and the AC current into or out of the converter.

6. The method of claim 1 further comprising monitoring an output voltage or current of the wireless power transfer circuit and switching the controllable power converter to control the output voltage or current.

7. The method of claim 1 further comprising switching the controllable power converter to control a phase angle of the controllable power converter over a phase angle range to thereby provide a range of controlled reactance to compensate for a range of variations in reactance seen at the input to the wireless power transfer circuit.

8. The method of claim 7 further comprising switching the controllable power converter such that the reactance seen at the input to the wireless power transfer circuit is minimally inductive.

9. The method of claim 6 further comprising switching the controllable power converter to compensate for variations in a level of charge of a battery that is charged from the output.

10. A wireless power transfer circuit comprising:
a compensation network;
a controllable power converter connected to at least one of a first output branch or a second output branch of the compensation network, the controllable power converter being configured to supply a load and to provide a controlled reactance, which controlled reactance in combination with the reactance of the compensation network substantially compensates for variations in reactance seen at an input to the wireless power transfer circuit,
wherein the wireless power transfer circuit is configured to operate to receive or transfer power wirelessly at a frequency that is not the tuned frequency of the tuned wireless power transfer circuit.

11. A wireless power transfer circuit as claimed in claim 10 wherein the compensation network comprises a first sub-network and a second sub-network, the first sub-network comprising a power transfer coil, and wherein the reactance of the first sub-network is substantially cancelled by the combined reactance of the second sub-network and the controlled reactance of the controllable power converter.

12. A wireless power transfer circuit as claimed in claim 10 wherein the controlled power converter is configured to control the phase angle to provide a range of controlled reactance.

13. A wireless power transfer circuit as claimed in claim 10 wherein the controlled power converter comprises one or more switches which are opened or closed to control the phase angle.

14. A wireless power transfer circuit as claimed in claim 11 wherein the first sub-network comprises the first branch of the compensation network and the second sub-network comprises the second branch of the compensation network.

* * * * *

UNITED STATES PATENT AND TRADEMARK OFFICE
CERTIFICATE OF CORRECTION

| | |
|---|---|
| PATENT NO. | : 12,368,325 B2 |
| APPLICATION NO. | : 17/842312 |
| DATED | : July 22, 2025 |
| INVENTOR(S) | : Duleepa Jayanath Thrimawithana et al. |

It is certified that error appears in the above-identified patent and that said Letters Patent is hereby corrected as shown below:

On the Title Page
Under Item (63) Related U.S. Application Data, please add:
--Item (30) Foreign Application Priority Data:
December 24, 2019 (NZ) ......................................... 760554--

In the Claims
Claim 1, Column 18, Line 55, please replace "combination with the reactance" with --combination with a reactance--
Claim 1, Column 18, Line 57, please replace "input to the wireless" with --input to the tuned wireless--
Claim 2, Column 19, Line 5-6, please replace "input to the wireless power transfer circuit while the wireless power transfer" with --input to the tuned wireless power transfer circuit while the tuned wireless power transfer--
Claim 3, Column 19, Line 9, please replace "The method claim 1" with --The method of claim 1--
Claim 4, Column 19, Line 14, please replace "to the wireless power" with --to the tuned wireless power--
Claim 5, Column 19, Line 17-19, please replace "between the AC voltage across the converter and the AC current into or out of the converter." with --between an AC voltage across the controllable power converter and an AC current into or out of the controllable power converter.--
Claim 6, Column 19, Line 21, please replace "current of the wireless power" with --current of the tuned wireless power--
Claim 7, Column 19, Line 29, please replace "to the wireless power" with --to the tuned wireless power--
Claim 8, Column 19, Line 32, please replace "to the wireless power" with --to the tuned wireless power--
Claim 9, Column 19, Line 36, please replace "from the output." with --from the output voltage or current.--
Claim 10, Column 20, Line 2, please replace "network;" with --network; and--
Claim 10, Column 20, Line 14-15, please replace "of the tuned wireless" with --of the wireless--

Signed and Sealed this
Second Day of September, 2025

Coke Morgan Stewart
*Acting Director of the United States Patent and Trademark Office*

CERTIFICATE OF CORRECTION (continued)
U.S. Pat. No. 12,368,325 B2

Claim 13, Column 20, Line 27-28, please replace "as claimed in claim 10" with --as claimed in claim 12--
    Claim 14, Column 20, Line 32, please replace "the first branch" with --the first output branch--
    Claim 14, Column 20, Line 34, please replace "the second branch" with --the second output branch--